(12) United States Patent
Kitamura

(10) Patent No.: US 7,650,363 B2
(45) Date of Patent: Jan. 19, 2010

(54) DOCUMENT MANAGEMENT SYSTEM, DOCUMENT MANAGEMENT PROGRAM AND RECORDING MEDIUM

(75) Inventor: Yuki Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 478 days.

(21) Appl. No.: 10/369,622

(22) Filed: Feb. 21, 2003

(65) Prior Publication Data

US 2003/0163490 A1     Aug. 28, 2003

(30) Foreign Application Priority Data

Feb. 25, 2002  (JP)  ............... 2002-048383
Feb. 4, 2003   (JP)  ............... 2003-027379

(51) Int. Cl.
*G06F 17/30*     (2006.01)
(52) U.S. Cl. ................... 707/200; 707/2; 707/104.1
(58) Field of Classification Search ............ 707/200, 707/2
See application file for complete search history.

(56) References Cited

U.S. PATENT DOCUMENTS 5,987,480 A * 11/1999 Donohue et al. .......... 715/501.1

(Continued)

FOREIGN PATENT DOCUMENTS

JP     7-13828    1/1995
JP     10-254745  9/1998

(Continued)

OTHER PUBLICATIONS

Sada, Morihiro, Practical Techniques for Managing Business Documents 7, OA Business PC, Japan, Dempa Shinbum Company, Jan. 1, 1999, vol. 17, No. 1, pp. 27-32.

(Continued)

*Primary Examiner*—Apu M Mofiz
*Assistant Examiner*—Monica M Pyo
(74) *Attorney, Agent, or Firm*—Dickstein Shapiro LLP

(57) ABSTRACT

A document management system for managing a document together with property information thereof in a folder can respond to various user's needs by providing some latitude with the property information. When the document management system detects some actions related to a document registering operation with a designated folder by a user, the document management system starts a template attaching process for attaching a template (property information) associated with the designated folder to a newly registered document. Even if a plurality of templates are provided to the folder, the document management system can attach all the templates to the document. In detail, the document management system reads templates in a template information table based on template IDs obtained from a folder-template correspondence table and then provides the read templates to the document to be processed. When the document is in another folder and is copied to a destination folder, the document management system associates templates attached to the source document with the destination folder and then attaches the document to the templates.

12 Claims, 22 Drawing Sheets

U.S. PATENT DOCUMENTS

| | | | |
|---|---|---|---|
| 6,055,527 A * | 4/2000 | Badger et al. | 707/2 |
| 6,549,916 B1 * | 4/2003 | Sedlar | 707/200 |
| 6,549,922 B1 * | 4/2003 | Srivastava et al. | 707/205 |
| 6,651,108 B2 * | 11/2003 | Popp et al. | 719/315 |
| 6,785,693 B2 * | 8/2004 | DeLorme et al. | 707/200 |
| 6,915,299 B1 * | 7/2005 | Arcuri et al. | 707/100 |
| 2002/0103689 A1 * | 8/2002 | Hornick et al. | 705/9 |

FOREIGN PATENT DOCUMENTS

| | | |
|---|---|---|
| JP | 2001-229174 | 8/2001 |
| JP | 2002-230010 | 8/2002 |

OTHER PUBLICATIONS

Igarashi, Hisakazu, Windows NT(4), Unix Magazine, Japan, ASCII Media Works Inc., May 1, 1994, vol. 9, No. 5, pp. 75-79.

Kondo, Daisuke, Must-Read Guide WinXP Setting Guide, PCfan, Japan, Mainichi Communications, Inc. Dec. 15, 2001, vol. 8, No. 32, pp. 73-85.

* cited by examiner

FIG.2

TEMPLATE INFORMATION TABLE

| TEMPLATE ID | TEMPLATE TITLE | PROPERTY INFORMATION |
|---|---|---|
| 00001 | RECEIVED DOCUMENT | TITLE:RECEIVE-0000n<br>CREATION DATE:SystemDate<br>UPDATE DATE:SystemDate<br>CREATOR:*******<br>COMMENT:****** |
| 00002 | MEETING MINUTES | TITLE:MINUTES-0000n<br>CREATION DATE:SystemDate<br>MEETING DATE:<br>CREATOR:*********<br>MEETING PLACE:A<br>NOTIFICATION NUMBER:0000n |
| 00003 | ORDER FORM (USER A) | TITLE:ORDER-0000n<br>CLIENT NAME:*********<br>LOCATION:JAPAN<br>RECEIVED DATE:SystemDate<br>STAFF:USER A<br>ORDER:<br>ORDERED NUMBER:YEN<br>ORDERED PRICE: |
| 00004 | ⋮ | ⋮ |
| 00005 | ⋮ | ⋮ |

FIG.3

MANAGEMENT FOLDER-TEMPLATE CORRESPONDENCE TABLE

| FOLDER ID | TEMPLATE ID |
|---|---|
| 00001 | 00001 |
| 00001 | 00003 |
| 00001 | 00004 |
| 00002 | 00002 |
| 00003 | 00001 |
| 00003 | 00005 |
| 00004 | 00006 |
| ⋮ | ⋮ |
| ⋮ | ⋮ |

FIG.4

TEMPLATE-DATA TYPE CORRESPONDENCE TABLE

| TEMPLATE ID | DATA TYPE |
|---|---|
| 00001 | TXT |
| 00002 | BMP |
| 00003 | JPG |
| 00004 | TIF |
| 00005 | PDF |
| ⋮ | ⋮ |
| ⋮ | ⋮ |
| ⋮ | ⋮ |

FIG.5

TEMPLATE-DATA TYPE CORRESPONDENCE TABLE

| TEMPLATE ID | DATA TYPE |
|---|---|
| 00001 | SCAN |
| 00002 | FILE IMPORT |
| 00003 | FAX RECEIVED |
| 00004 | FSX SENDED |
| 00005 | MAIL RECEIVED |
| ⋮ | ⋮ |
| ⋮ | ⋮ |
| ⋮ | ⋮ |

FIG.14

PROPERTY OF FOLDER 'kita-CW2 test'

GENERAL

FOLDER NAME (N):
kita-CW2 test

LOCATION: acorn/Plumeria/test
SIZE:
CREATION DATE: 2001/07/19 16:42:20

☑ DEFAULT DOCUMENT TYPE (E)
FAX RECEIVED ▶

DISPLAY SIZE (D)

OK  CANCEL  APPLY (A)  HELP (H)

FIG.15

INPUT OF DOCUMENT INFORMATION-1/1

| DOCUMENT INFORMATION | RELATED DOCUMENT | ACCESS AUTHORITY | ADDITIONAL PROCESS |

VERSION: 1  0  COMMENT (C)...

DOCUMENT TYPE (T): FAX RECEIVED

SIZE: 29,184 BYTES

MEMO (O):

SPECIFICATION (S):

USER'S NAME:

FAX RECEIVED INFORMATION:

FAX NAME:

KEY WORD EXTRACTION 1:

KEY WORD EXTRACTION 2:

PAGE NUMBER:

FAX RECEIVED DATE: 2003/01/10

HELP (H)

OK   CANCEL

FIG.21

| SOURCE DOCUMENT FILE | FOLDER TEMPLATES DO NOT SUPPORT | FOLDER TEMPLATES SUPPORT |
|---|---|---|
| DOCUMENT INFORMATION (PROPERTY INFORMATION) | (1) TEMPLATES OF SOURCE DOCUMENT FILE ARE INHERITED | (2) TEMPLATES OF SOURCE DOCUMENT FILE ARE INHERITED OR FOLDER TEMPLATES ARE ADOPTED |
| NO DOCUMENT INFORMATION (PROPERTY INFORMATION) | (3) USER INPUTS TEMPLATE OF DOCUMENT FILE | (4) FOLDER TEMPLATES ARE ADOPTED |

DOCUMENT MANAGEMENT SYSTEM, DOCUMENT MANAGEMENT PROGRAM AND RECORDING MEDIUM

BACKGROUND OF THE INVENTION

1. Field of the Invention

The present invention generally relates to systems for managing a document by using a folder, and more particularly to a document management system and a document management program for automatically providing template information (property information) to a document in a folder thereof.

2. Description of the Related Art

A document processing system such as a personal computer and a document filing system is used to process a large number of documents. Conventionally, such a document processing system stores and manages processed documents in a storage part thereof so as to use the documents in the future. In order to conveniently use the stored document, the documents are classified and managed in a folder (directory). Such a folder system is constructed in accordance with predetermined classification criteria so that a user can easily find and access a desired document.

In the above-mentioned conventional document management method, when the user sets a document file in a document processing system, the user has to create folders in the document processing system in advance and determine a folder suitable for the document file based on the classification criteria of the folder system thereof. Then, the user sets the document file in the determined folder by moving or copying the document file. Furthermore, when the user wants to move an existing document file in a folder to another folder, the user determines the folder where the document file is to be newly set and then moves or copies the document file to the folder.

According to the conventional document management method, when a user stores and manages a document file in the document processing system, the user has to perform some tasks as mentioned above.

Japanese Laid-Open Patent Application No. 07-13828 discloses a file management device that can eliminate the above-mentioned problem. In the file management device, a user is required to register file classification information to a file or a folder. Based on the registered file classification information, a file is automatically classified in a folder suitable for the file. According to the file management device, the user can manage the file with little awareness of the file classification. Therefore, it is possible to reduce user's work load related to file management.

Also, when a user stores and manages a document file in a folder, the user can attach property information such as a document management item to the document file. The property information is registered in a database and serves as the document management information or the document setting information of a document management system. In a conventional document management system, when a user attempts to attach such property information to some document files therein, the user has to individually attach the property information to the document files. According to the conventional document management system, the user has to perform many tasks to register the property information to the document files. As a result, such a conventional document management system is undesirable with respect to operability and efficiency.

Japanese Laid-Open Patent Application No. 10-254745 discloses a document management system that can efficiently manage a document file by using property information. In the document management system, folder property information (folder template information) is registered for each folder and stored in a database. When a user inputs a document file in a folder in the document management system, the document management system searches the database for the property information corresponding to the folder and attaches the found property information to the document file. According to the document management system, it is possible to efficiently manage a document file registered in a folder in the document management system.

However, in the file management device according to Japanese Laid-Open Patent Application No. 07-13828, when a document file is classified, the file management device examines contents or an extension of the document file and determines a file type of the document file. Based on the determined file type, the file management system determines in which folder the document file should be registered with reference to a predetermined classification table in which the correspondence between file types and the folders in the file management system is described. According to the file management device, once a document file is classified in a folder, a user cannot move and copy the document file to another folder without changing the contents or the extension thereof.

Also, the document management system according to Japanese Laid-Open Patent Application No. 10-254745 is related to only a newly created document file. Namely, when a user registers a new document file in a folder in the document management system, the document management system serves to efficiently set property information to the newly registered document file. In contrast, the document management system cannot handle cases where a user reregisters a document file whose property information has already been registered in a folder in the document management system, and where the user moves or copies a document file whose property information has already been registered in a folder in the document management system to another folder therein. Furthermore, the document management system has a problem in that the document management system systematically attaches predetermined property information of the folder to the document file without any consideration regarding differences among document files in the folder. Namely, the document management system cannot prepare some patterns of property information for a folder so that the user can flexibly set the most suitable attribute information pattern to the document file based on the document information thereof.

Japanese Laid-Open Patent Application No. 2002-230010 discloses a document management system that can eliminate the above-mentioned problems. The document management system registers a document file in a folder based on predetermined classification and manages the registered document file in a database thereof. The document management system can efficiently attach a property information pattern and property information content suitable for the document file in accordance with differences among document files in the folder. Furthermore, even when a registered document file is reclassified in another folder or when the registered document file is moved or copied to another folder, the document management system tends to reduce user's tasks and efficiently perform the above processes. Namely, the document management system is designed to properly manage the document file with reduced user's tasks.

In order to achieve the above-mentioned purpose, the document management system has a registration function as a primary component. The registration function maintains a plurality of property information patterns for each folder and attaches a selected property information pattern to a document file to be registered.

In this fashion, the document management system mainly has interest in the "selectability" among the property information patterns prepared for a folder and attaches only a selected property information pattern to a document file to be registered in the folder. In particular, the document management system registers exactly one property information pattern.

If only a selected property information pattern is registered to a document file as mentioned above, there is a probability that the document management system cannot successfully respond to environmental variations of the document management system and various user's needs in the future.

SUMMARY OF THE INVENTION

It is a general object of the present invention to provide a document management system and a document management program that can register and manage a document file provided with property information in a folder therein.

A more specific object of the present invention is to provide a document management system that can respond to a variety of user's needs by providing some latitude with respect to the provided property information rather than limiting the property information to a single pattern.

In order to achieve the above-mentioned objects, there is provided according to one aspect of the present invention a document management system for managing a document in a folder with which document property information is associated wherein the folder is in a hierarchical structure, comprising: a processing part, when one of a subfolder and a document is set in the folder, associating document property information with the one based on all document property information associated with the folder and retaining the one associated with the document property information and the document property information therein.

According to the above-mentioned invention, when a subfolder or a document file is registered in a folder, it is possible to provide the subfolder or the document file with a plurality of templates (property information) based on all property information associated with the folder. Since a conventional document management system selectively provides only one selected template to the newly registered subfolder or the document file, a user has to perform an additional template attaching operation in a sense that the user selectively attaches one of the templates of the folder. However, the document management system according to the present invention enables the user to set a plurality of templates to the subfolder or the document file with less load work. As a result, it is possible to respond to various needs of the user when the user uses the document file.

Additionally, there is provided according to another aspect of the present invention a document management system for managing a document in a folder with which document property information is associated wherein the folder is in a hierarchical structure, comprising: a processing part, when one of a subfolder and a document is set in the folder, associating document property information with the folder based on all document property information associated with the one and retaining the folder associated with the document property information and the document property information therein.

According to the above-mentioned invention, when a subfolder or a document file is registered in a folder, it is possible to provide the folder with a plurality of templates (property information) based on all property information associated with the subfolder and the document file. Therefore, the document management system according to the present invention enables the user to set a plurality of templates suitable for the folder in accordance with various document files with less load work. As a result, it is possible to respond to various needs of the user when the user uses the document file.

Additionally, there is provided according to another aspect of the present invention a document management system for managing a document in a folder with which document property information is associated wherein the folder is in a hierarchical structure, comprising: a processing part, when one of a subfolder and a document is set in the folder, associating document property information with the one and the folder based on both all document property information associated with the one and all document property information associated with the folder and retaining the one and the folder associated with the document property information and the document property information therein.

According to the above-mentioned invention, since the previous two inventions are integrated into the above-mentioned invention, it is possible to achieve better performance and operability.

Additionally, there is provided according to another aspect of the present invention a document management system for managing a document in a folder with which document property information is associated wherein the folder is in a hierarchical structure, comprising: a processing part, when one of a subfolder and a document is set in the folder, associating all document property information corresponding to a data type of the document with the one and the folder and retaining the one and the folder associated with all the document property information and all the document property information therein.

According to the above-mentioned invention, when a subfolder or a document file is registered in a folder, it is possible to provide one of the subfolder and the document file and the folder with all templates (property information) corresponding to data types of the document file. As a result, it is possible to respond to various needs of the user when the user uses the document file.

In the above-mentioned document management system, the document property information associated with the folder may be copied to a subfolder of the folder.

According to the above-mentioned invention, since document property information associated with the folder can be copied in the subfolder, it is possible to easily set a template environment suitable for the user's use.

In the above-mentioned document management system, the document, property information associated with the folder, the document property information associated with the subfolder and the document property information associated with the document may be rewritten.

According to the above-mentioned invention, since the document property information associated with the folder, the subfolder and the document file can be rewritten, it is possible to easily set a template environment suitable for the user's use.

In the above-mentioned document management system, the document property information associated with said folder, the document property information associated with said subfolder and the document property information associated with said document may be output for confirmation of the user.

According to the above-mentioned invention, since the document property information associated with the folder, the subfolder and the document file can be output so that the user can confirm the operation in advance, it is possible to prevent an accidental erroneous operation.

Additionally, there is provided according to another aspect of the present invention a recording medium for recording a document management program for causing a computer to manage a document in a folder with which document property information is associated wherein the folder is in a hierarchical structure, comprising: a first processing step of, when one of a subfolder and a document is set in the folder, associating document property information with the one based on all document property information associated with the folder and retaining the one associated with the document property information and the document property information therein; a second processing step of, when one of a subfolder and a document is set in the folder, associating document property information with the folder based on all document property information associated with the one and retaining the folder associated with the document property information and the document property information therein; a third processing step of, when one of a subfolder and a document is set in the folder, associating document property information with the one and the folder based on both all document property information associated with the one and all document property information associated with the folder and retaining the one and the folder associated with the document property information and the document property information therein; and a fourth processing step of, when one of a subfolder and a document is set in the folder, associating all document property information corresponding to a data type of the document with the one and the folder and retaining the one and the folder associated with all the document property information and all the document property information therein, wherein the first processing step, the second processing step, the third processing step and the fourth processing step are selectively performed in accordance with an instruction of a user.

According to the above-mentioned invention, since a document management program for implementing the above-mentioned document management system is provided as a computer readable recording medium, it is possible to use a computer to easily implement the above-mentioned document management system.

Other objects, features and advantages of the present invention will become more apparent from the following detailed description when read in conjunction with the accompanying drawings.

BRIEF DESCRIPTION OF THE DRAWINGS

FIG. 2 is a diagram illustrating an example of a template information table according to the present invention;

FIG. 3 is a diagram illustrating an example of a management folder-template correspondence table according to the present invention;

FIG. 4 is a diagram illustrating an example of a template-data type correspondence table according to the present invention;

FIG. 5 is a diagram illustrating another example of the template-data type correspondence table according to the present invention;

FIG. 14 is a diagram illustrating a display example of a template associated with a folder;

FIG. 15 is a diagram illustrating a display example of template information setting items;

FIG. 21 is a diagram illustrating correspondence between document status and template information providing processes according to a tenth embodiment of the present invention;

DETAILED DESCRIPTION OF THE PREFERRED EMBODIMENTS

In the following, embodiments of the present invention will be described with reference to the accompanying drawings.

Figure 1:
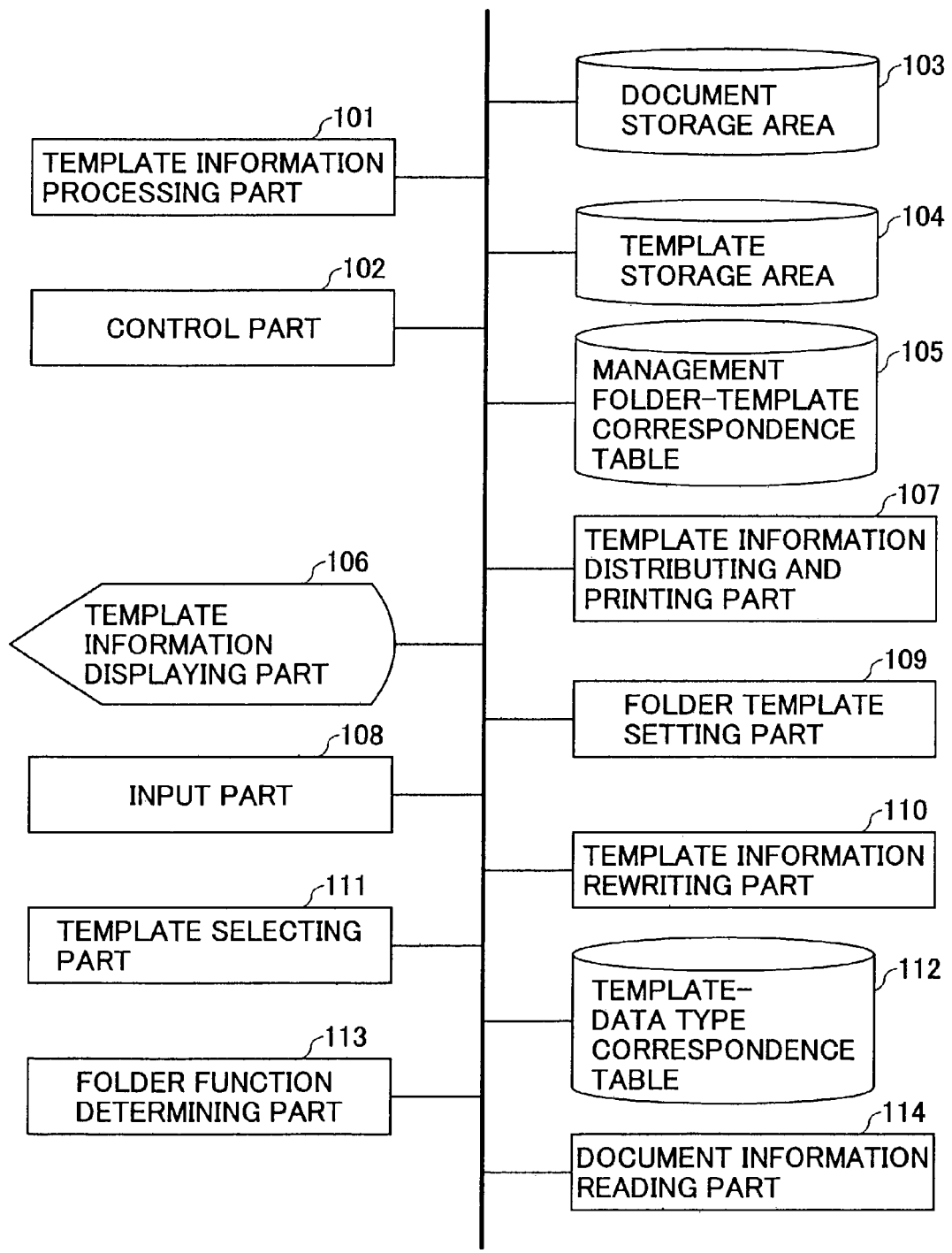
FIG. 1 is a block diagram roughly illustrating a system structure of a document management system according to the present invention.

FIG. 1 is a block diagram roughly illustrating a system structure of a document management system according to the present invention. Here, FIG. 1 is used in common for embodiments of the present invention to be provided later wherein components necessary for all the embodiments are illustrated and therefore some of the components may be unnecessary depending on the embodiment.

As is shown in FIG. 1, the document management system comprises a template information processing part 101, a control part 102, a document storage area 103, a template storage area 104, a management folder-template correspondence table 105, a template information displaying part 106, a template information distributing and printing part 107, an input part 108, a folder template setting part 109, a template information rewriting part 110, a template selecting part 111, a template-data type correspondence table 112, a folder function determining part 113 and a document information reading part 114.

The template information processing part 101 has a template information reading function for reading template information from the template storage area 104, a template information setting function for setting template information by writing information in the template storage area 104, a template determining function for determining a template to be processed by reading management information in the management folder-template correspondence table 105 or the document storage area 103, and a template providing function for providing the read template information to a folder or a document file to be processed.

The control part 102 performs an operation necessary to control the above-mentioned components in the document management system and manage a document file therein.

The document storage area 103 is provided to store a document file in a folder under an accessible status. Since each document file has a template, the document storage area 103 maintains the document file together with the corresponding template under a status where the document file is associated with the template or maintains another area in the document storage area 103 where the correspondence between the document file and the corresponding template is maintained as management information.

The template storage area 104 is provided to store property information of a folder as a template thereof under an accessible status. FIG. 2 shows an example of a template information table in the template storage area 104. As is shown in FIG. 2, the template storage area 104 has a template information table wherein a template ID is assigned to each template and the template has a template title and property information described corresponding to the type of the document file.

The management folder-template correspondence table 105 indicates the correspondence between management folders and templates of document files therein. FIG. 3 shows an example of the management folder-template correspondence table 105 wherein a folder ID is provided to each folder and all combinations between the folder IDs and the corresponding template IDs are described. As is shown in FIG. 3, there is a case where a folder is associated with a plurality of templates or a template is associated with a plurality of folders.

The template information displaying part 106 displays desired template information in a template information table in the template storage area 104 in accordance with an instruction of a user.

The template information distributing and printing part 107 distributes template information to an exterior of the document management system in accordance with an instruction of a user and prints desired template information in a template information table in the template storage area 104.

The input part 108 is used for a user to operate the document management system.

The folder template setting part 109 sets template information inherited from a document file to a folder or from a folder to another folder. If folders in the document management system are constructed as a hierarchical structure, the folder template setting part 109 sets template information inherited from a parent folder to a child folder.

The template information rewriting part 110 rewrites template information that is to be attached to a document file through writing by the user.

The template selecting part 111 automatically determines a template to be attached to a document file. The template selecting part 111 has a document type determining function for determining a data type of the document file and a template-data type correspondence table reading function for reading a template-data type correspondence table 112 to be provided later.

The template-data type correspondence table 112 indicates the correspondence between templates of document files and data types thereof. FIG. 4 and FIG. 5 show examples of the template-data type correspondence table 112. FIG. 4 handles a case where the extension of a document file is set as a data type. In this case, combinations of templates and the corresponding extensions are described in the template-data type correspondence table 112. FIG. 5 handles a case where a data input source, which indicates where the document file comes from, is set as a data type. In this case, combinations of templates and the corresponding data input-sources are described in the template-data type correspondence table 112. In these examples, a template corresponds to exactly one data type.

The folder function determining part 113 determines whether or not a folder to/from which a document file will be registered or copied has a folder function for handling a template of the document file.

The document information reading part 114 reads property information and others of a copied document file.

A description will now be given of some functions of the above-mentioned document management system by using the following first embodiment through the tenth embodiment of the present invention.

A document management system according to the first embodiment can provide a document file with all the templates attached to an existing folder where the document file is to be registered. Namely, when the existing folder has a plurality of templates, the document management system can attach all the templates to the document file rather than only a selected one of the templates as in the conventional document management systems. As a result, it is possible to make extensive use of the document file by providing a plurality of templates to the document file.

Figure 6:
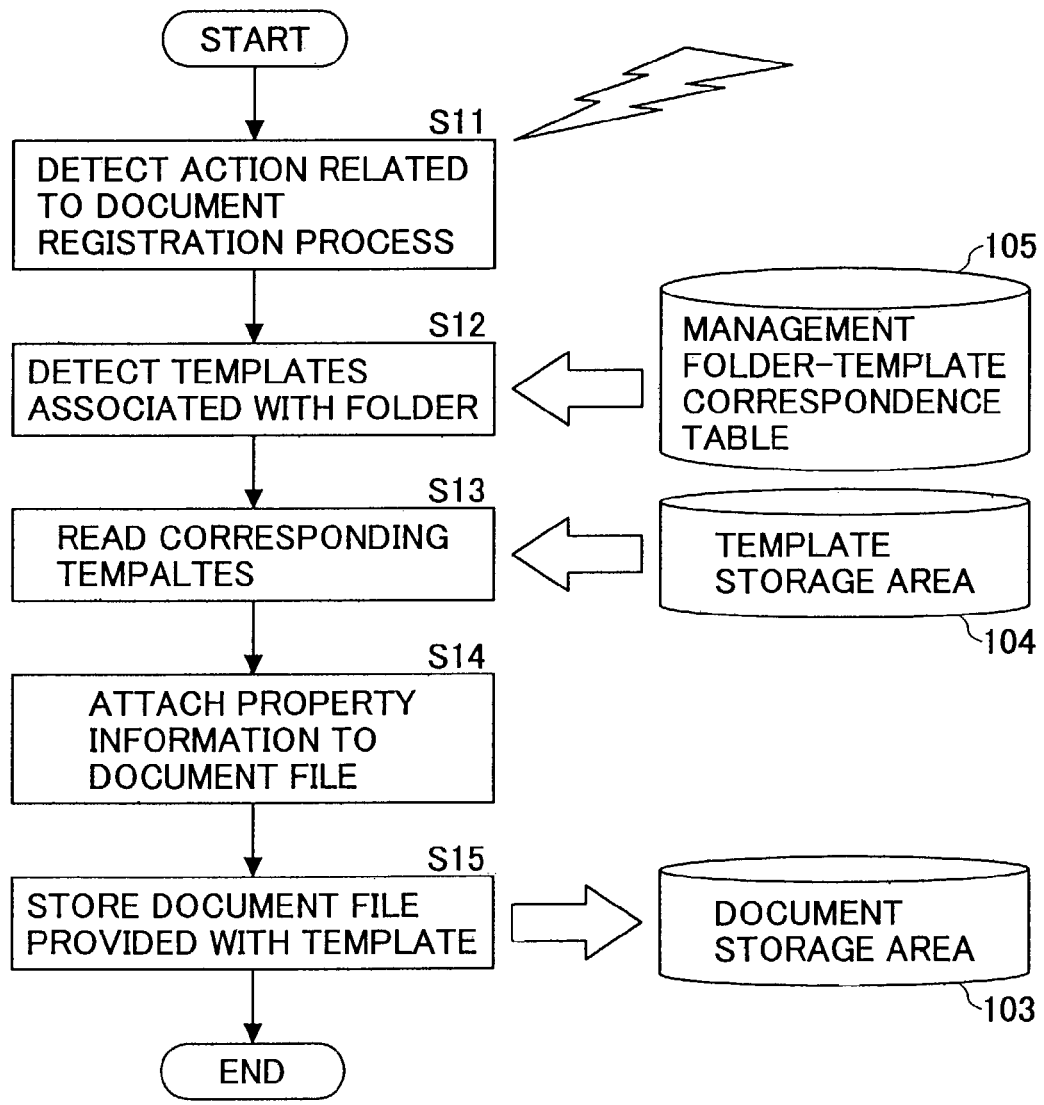
FIG. 6 is a flowchart of a document registration process according to a first embodiment of the present invention.

FIG. 6 is a flowchart of a document registration process for providing a document file with a plurality of templates.

When the document management system according to the first embodiment detects some actions related to the document registration process such as a document creating operation by a user or a file delivery through e-mail, the control part 102 starts the document registration process for storing a document file provided through these actions and attaching a template to the stored document file (step S11). After the document registration process is started, the control part 102 causes the template information processing part 101 to perform the following procedure.

The template information processing part 101 reads a template ID associated with a designated folder for the document file with reference to the management folder-template correspondence table 105 and then determines the corresponding template (step S12). Here, even if the designated folder is associated with a plurality of templates, all the templates are handled as template information to be attached to the document file.

Based on the obtained template ID, the template information processing part 101 reads the corresponding template with reference to a template information table in the template storage area 104 (step S13) and then attaches the template (property information) in the template information table to the document file (step S14). For instance, if the designated folder has the folder ID 00002, the template information processing part 101 determines that the corresponding template ID is 00002 with reference to the management folder-template correspondence table 105 in FIG. 3. Then, the template information processing part 101 reads the template "meeting minutes" in the template information table in FIG. 2 and attaches the template to the document file.

The template information processing part 101 stores the document file provided with the template in the document storage area 103 (step S15) and then the document registration process is terminated.

In this fashion, when a document file is newly registered, all the corresponding templates are attached to the document file. As a result, it is possible to respond to various needs of a user when the document file is used hereinafter.

A document management system according to the second embodiment can provide a parent folder and a child folder thereof with all templates attached to both the parent folder and the child folder. Namely, when a child folder is created in a parent folder or a child folder is copied to a parent folder, the folders can mutually inherit the templates attached to these related folders. As a result, it is possible to prepare for a folder environment capable of responding to various templates.

Figure 7:
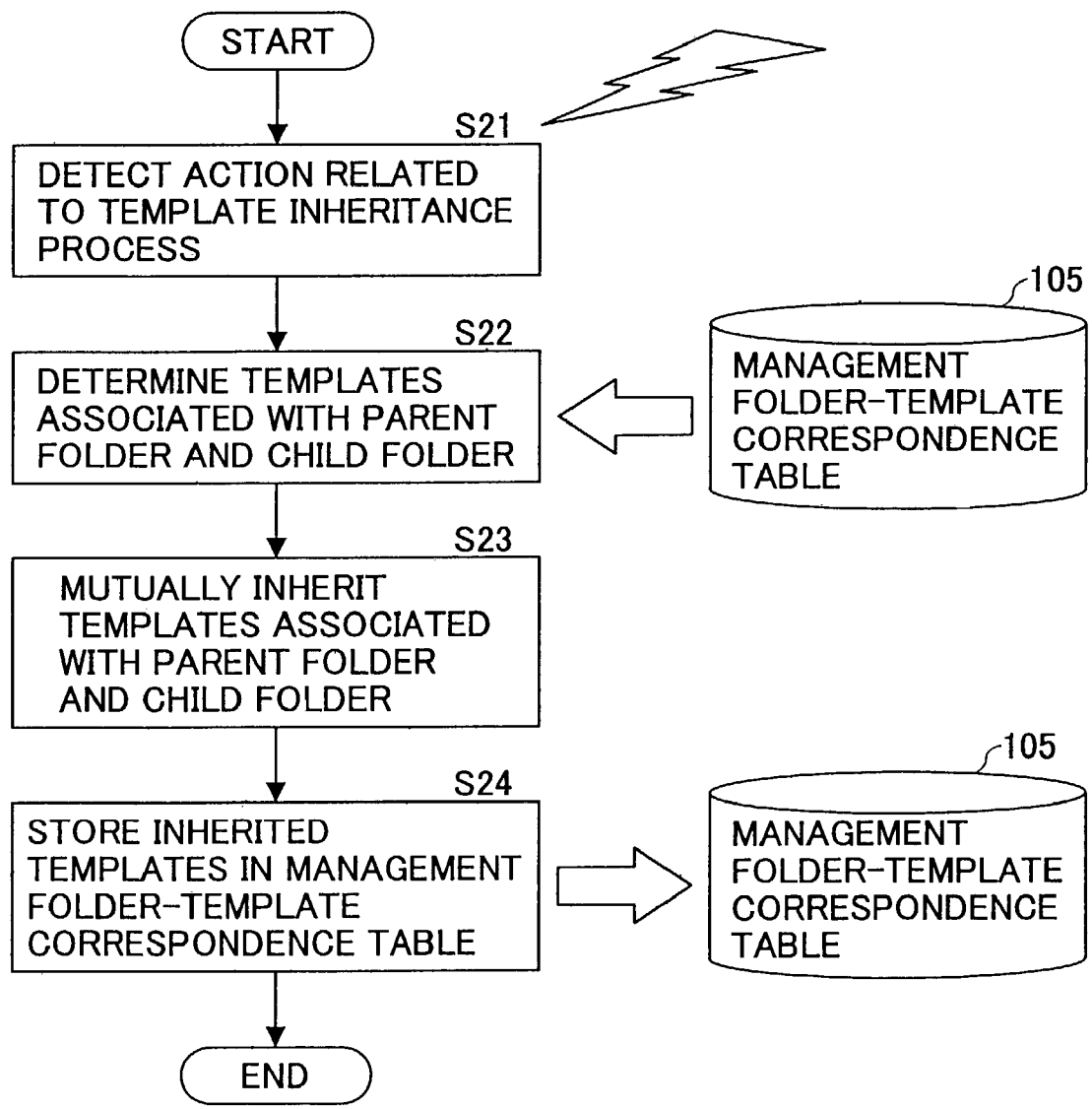
FIG. 7 is a flowchart of a template inheritance process according to a second embodiment of the present invention.

FIG. 7 is a flowchart of a template inheritance process according to the second embodiment for providing a parent folder and a child folder thereof with all templates registered to both the folders. The folder template setting part 109 works for the template inheritance process.

When the document management system according to the second embodiment detects some actions related to the template inheritance process such as a folder creating operation or a folder copying operation from another folder, the control part 102 starts the template inheritance process for mutually providing all templates associated with both a parent folder and a newly registered child folder thereof (step S21).

After the template inheritance process is started, the control part 102 causes the folder template setting part 109 to read template IDs associated with the designated parent folder and the newly registered child folder thereof and determine the corresponding templates (step S22). Here, if the child folder is newly created, the folder template setting part 109 does not have to determine the template with respect to the child folder.

The folder template setting part 109 selects templates that the parent folder and the child folder do not possess in common among all the templates possessed by the parent folder and the child folder in order to determine templates to be mutually inherited (step S23).

The folder template setting part 109 stores the determined template IDs in the management folder-template correspondence table 105 in order to associate the template IDs with the folders (step S24) and then the template inheritance process according to the second embodiment is terminated.

A document management system according to the third embodiment has a function for providing a folder and a document file to be copied therein with all templates attached to both the folder and the document file. Namely, when a document file is copied to a folder, the folder and the document file can mutually inherit all templates attached to both the folder and the document file. As a result, it is possible to prepare for a folder environment capable of responding to various templates.

Figure 8:
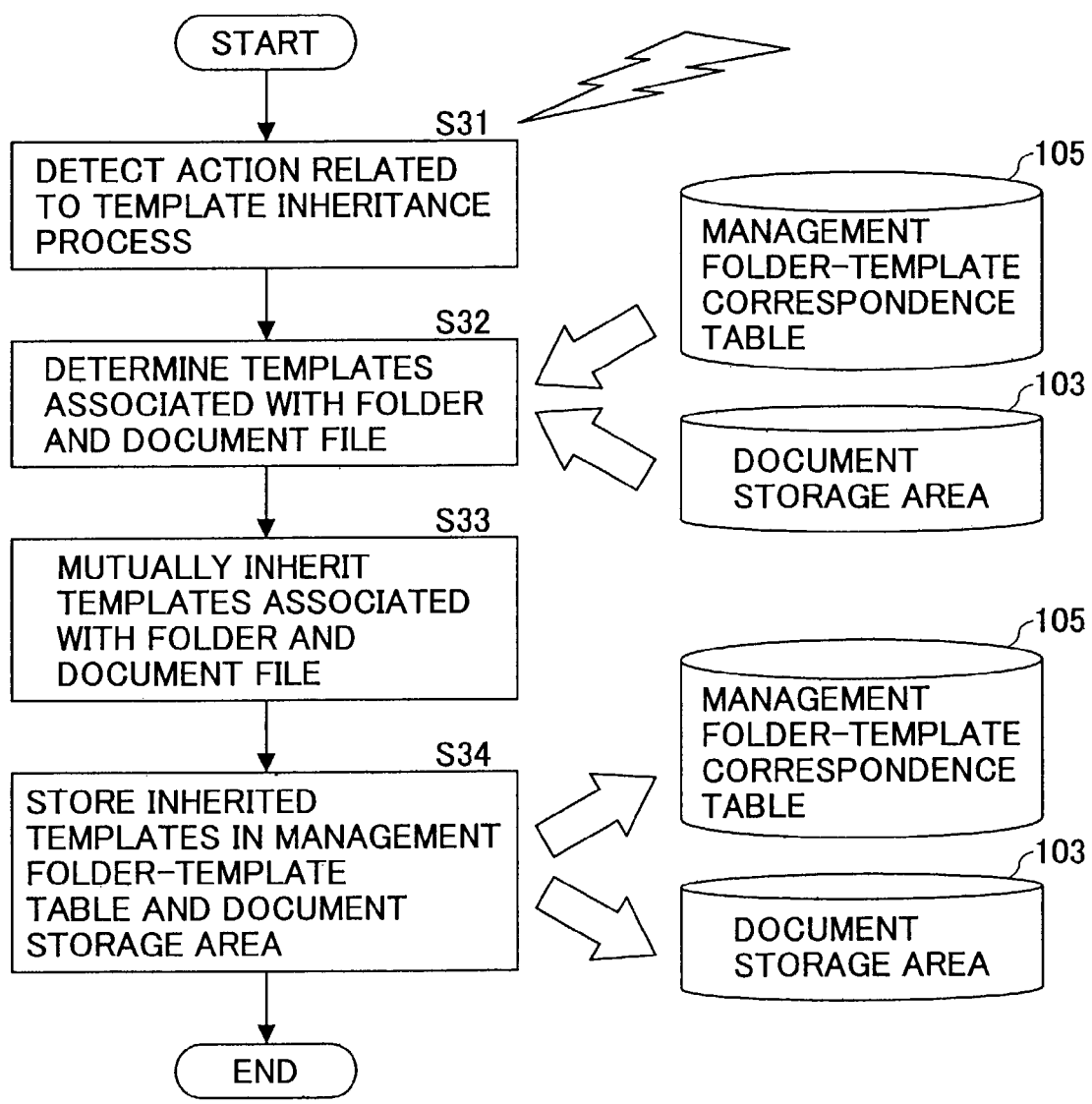
FIG. 8 is a flowchart of a template inheritance process according to a third embodiment of the present invention.

FIG. 8 is a flowchart of a template inheritance process according to the third embodiment. The folder template setting part 109 works for the template inheritance process.

When the document management system according to the third embodiment detects some actions related to the template inheritance process such as a document file copying operation to a folder, the control part 102 starts the template inheritance process (step S31).

In order to mutually provide the folder and the document file to be copied therein with all templates registered to both the folder and the document file, the control part 102 causes the folder template setting part 109 to read template IDs associated with the designated folder with reference to the management folder-template correspondence table 105 and template IDs associated with the document file in a management area in the document storage area 103 and then determine the corresponding templates to be processed (step S32).

Based on the obtained templates, the folder template setting part 109 selects templates that the folder and the document file possess in common in order to determine the templates to be mutually inherited (step S33). The folder template setting part 109 stores the determined template IDs in the management folder-template correspondence table 105 with respect to the folder and in the document storage area 103 with respect to the document file (step S34) and then the template inheritance process according to the third embodiment is terminated.

A document management system according to the fourth embodiment can provide a document file with a template prepared in association with a data type of the document file such as the extension or the data input source. As a result, it is possible to respond to various uses of template information.

Figure 9:
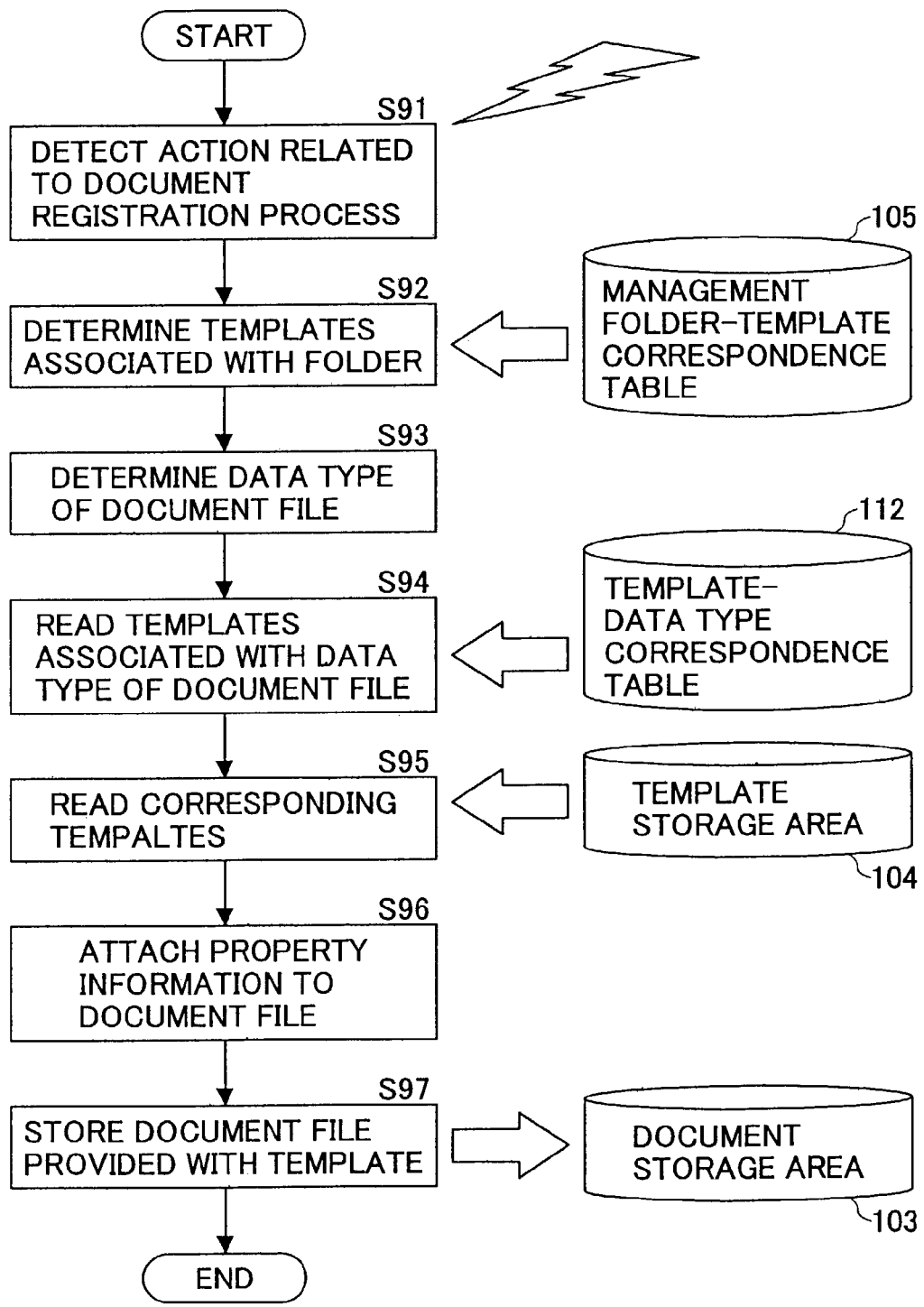
FIG. 9 is a flowchart of a document registration process according to a fourth embodiment of the present invention.

FIG. 9 is a flowchart of a document registration process according to the fourth embodiment for providing a document file with a template corresponding to the data type thereof. Here, this embodiment handles a case where the document file is additionally provided with a template associated with a designated folder in which the document file is stored.

When the document management system according to the fourth embodiment detects some actions related to the document registration process such as a document registration by a user or a file delivery through e-mail, the control part 102 starts the document registration process for storing a document file provided through these actions and attaching an appropriate template to the document file (step S91). After the document registration process is started, the control part 102 causes the template information processing part 101 to read template IDs associated with the designated folder where the document file is to be stored with reference to the management folder-template correspondence table 105 and then determines the corresponding templates (step S92).

Then, the template selecting part 111 determines the data type of the document file (step S93). Here, the data type is determined based on a file extension as shown in FIG. 4 or a data input source as shown in FIG. 5. The template selecting part 111 reads a template ID corresponding to the determined data type with reference to the template-data type correspondence table 112 (step S94). For instance, if the data type is determined based on file extensions shown in FIG. 5, the template selecting part 111 reads the template ID "00001" for the extension "TXT" and the template ID "00003" for the extension "FAX Received".

Based on the obtained template ID, the template information processing part 101 reads the corresponding template with reference to a template information table in the template storage area 104 (step S95) and then attaches the template (property information) in the template information table to the document file (step S96). As is shown in FIG. 3, for instance, if the designated folder has the folder ID 00002, the template information processing part 101 determines that the corresponding template ID is 00002 with reference to the management folder-template correspondence table 105. Then, the template information processing part 101 reads the template "meeting minutes" corresponding to the template ID 00002 in the template information table in FIG. 2 and attaches the template to the document file.

Then, the template information processing part 101 stores the document file provided with the template in the document storage area 103 (step S97) and the document registration process according to the fourth embodiment is terminated.

In the fourth embodiment, if the template attached to the document file in association with the data type is not registered as the template associated with the folder, the folder inheritance process is additionally performed so that the folder can properly handle the document file provided with the template therein.

A document management system according to the fifth embodiment can output a template attached to a document file and a folder so that a user can confirm which template is attached to the document file and the folder when the user attempts to operate the document management system for the document registration process and the template inheritance process. In this embodiment, the template is output to the user in the three forms: displaying, distributing and printing.

Figure 10:
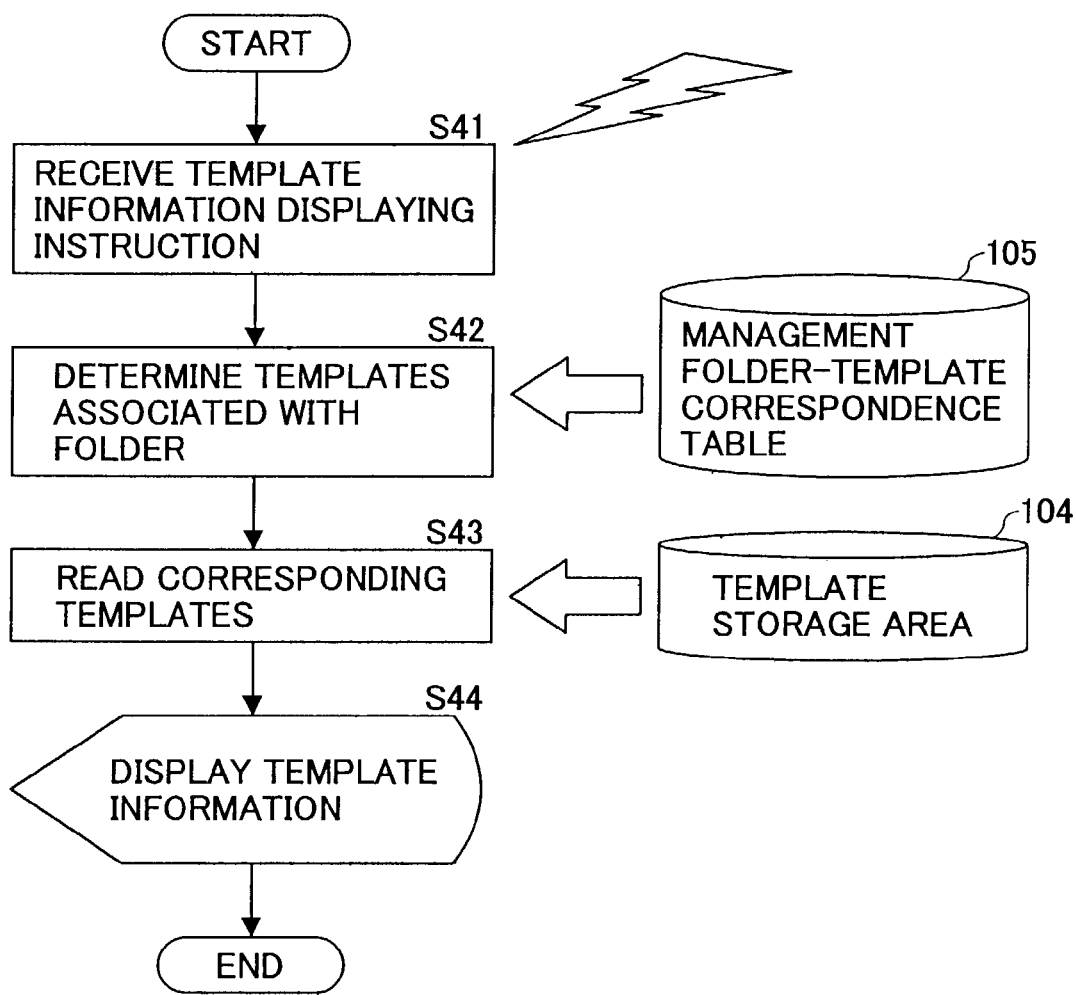
FIG. 10 is a flowchart of a template information displaying process according to a fifth embodiment of the present invention.
Figure 11:
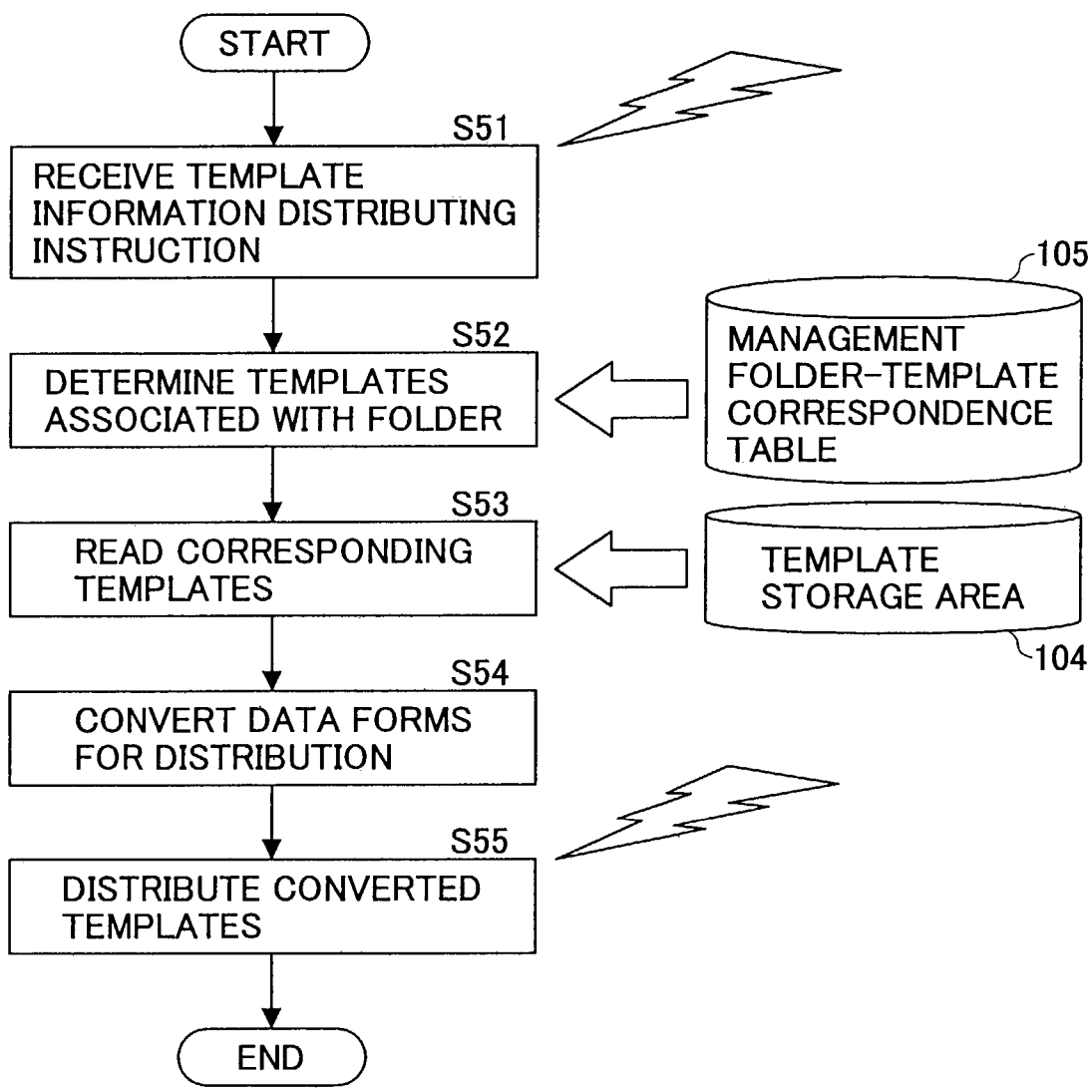
FIG. 11 is a flowchart of a template information distributing process according to the fifth embodiment of the present invention.
Figure 12:
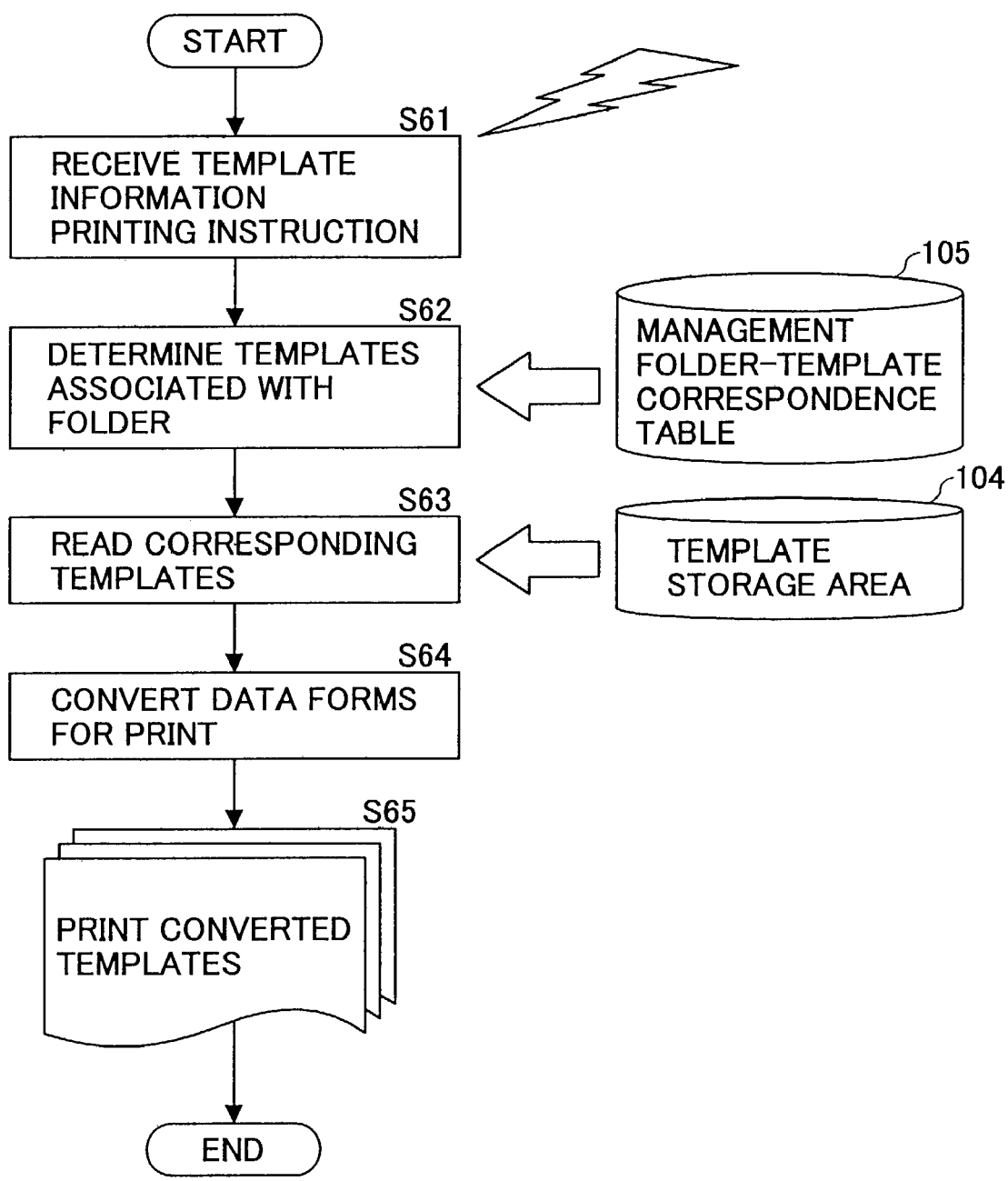
FIG. 12 is a flowchart of a template information printing process according to the fifth embodiment of the present invention.

FIGS. 10 through 12 are flowcharts of the template information output process according to the fifth embodiment. FIG. 10 handles a case where the output template is displayed on the template information displaying part 106, and FIG. 11 and FIG. 12 handle cases where the output template is distributed and where the output template is printed on the template distributing and printing part 107, respectively.

Referring to FIG. 10, when a user designates a folder and instructs the document management system to display a template attached to the folder, the control part 102 starts the template information displaying process for displaying the template (step S41).

The control part 102 causes the template information processing part 101 to read the template IDs attached to the designated folder with reference to the management folder-template correspondence table 105 and then determine the template to be processed (step S42).

Based on the obtained template IDs, the template information processing part 101 reads the corresponding templates with reference to the template information table in the template storage area 104 (step S43).

Then, the read templates are displayed as the template information regarding the designated folder on the template information displaying part 106.

Referring to FIG. 11 and FIG. 12, when a user designates a folder and instructs the document management system to distribute and print templates attached to the folder (steps S51 and S61), the control part 102 causes the template information processing part 101 to obtain template IDs associated with the designated folder (steps S52 and S62) and read the corresponding templates (steps S53 and S63), respectively.

After that, the read corresponding templates are converted into data forms convenient to distribute the template, for instance, a file, to another folder (step S54). Then, the template information distributing and printing part 107 copies the converted templates in another folder or distributes the converted template to another computer connected via a network (step S55) and then the template information distributing process is terminated.

On the other hand, the template information printing process converts the read corresponding templates into data forms convenient to print the templates, for instance, PDF file form, PostScript file form, an image data form or the like (step S64). When the converted templates are delivered to the template information distributing and printing part 107, the template information distributing and printing part 107 prints out the converted templates (step S65) and then the template information printing process is terminated.

The above description handles the case where the template information output process is related to the output of a folder. However, the template information output process can also deal with the output of a document file like the above-mentioned process with respect to the output of the folder except for the fact that the document file has information regarding template correspondence in the document storage area 103.

A document management system according to the sixth embodiment of the present invention can rewrite a template attached to a folder by a user's manipulation in order to customize the template in the template storage area 104.

Figure 13:
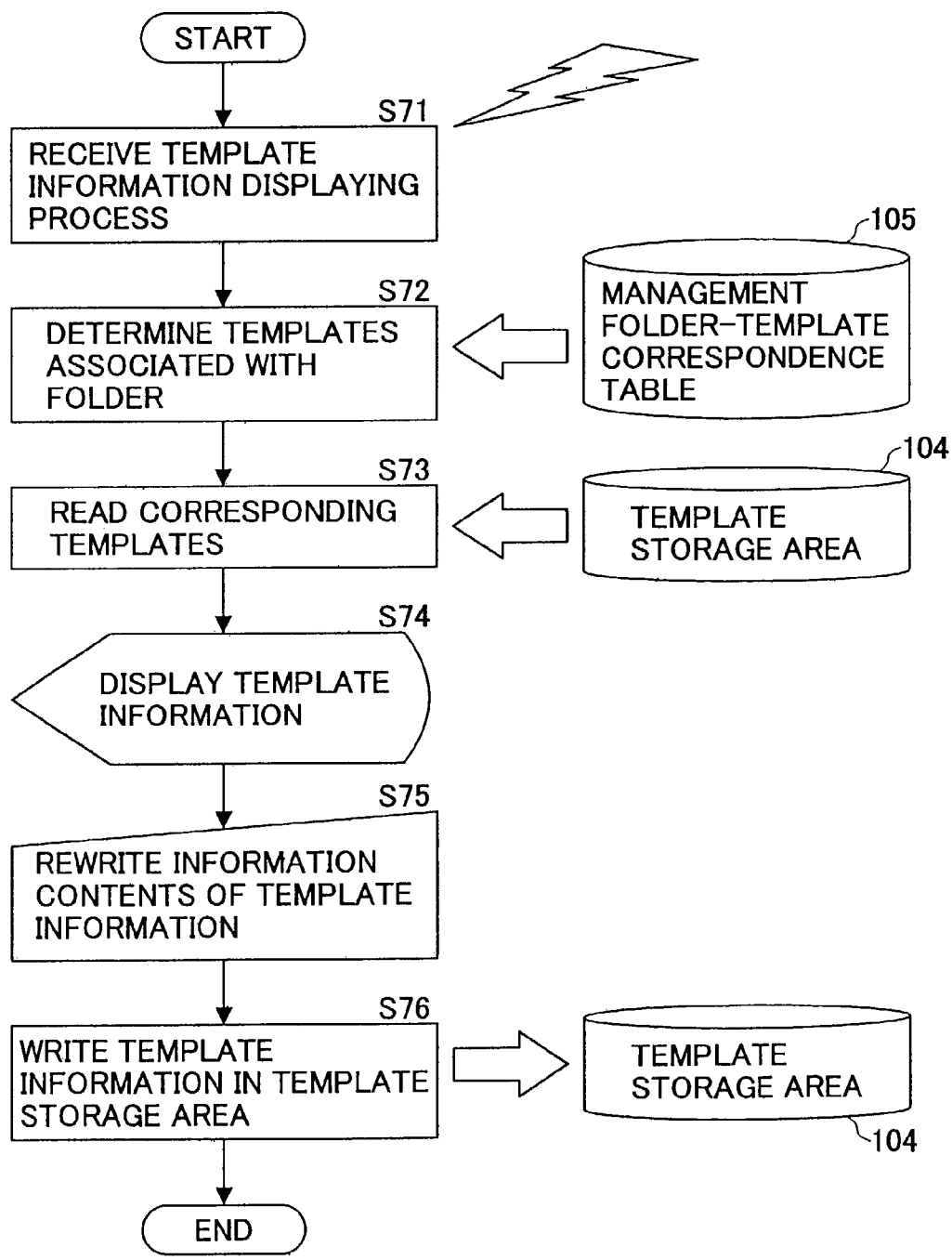
FIG. 13 is a flowchart of a template information rewriting process according to a sixth embodiment of the present invention.

FIG. 13 is a flowchart of the template information rewriting process. In this embodiment, the template information rewriting process is performed by a user's input manipulation through a GUI (Graphical User Interface).

When a user designates a folder and instructs the document management system to display templates attached to the folder, the control part 102 performs the following process for displaying the templates (step S71).

The control part 102 causes the template information processing part 102 to read template IDs associated with the designated folder with reference to the management folder-template correspondence table 105 and then determines the templates to be processed (step S72).

Based on the obtained template IDs, the template information processing part 101 reads the corresponding templates with reference to the template information table 105 in the template storage area 104 (step S73).

Then, the template information displaying part 106 displays the read corresponding templates. FIG. 14 shows an example of the displayed template information on the template information displaying part 106.

When such template information is displayed, the user can select an item that the user wants to change among items that the user is allowed to change. In order to change information contents of the item, the user uses the input part 108 such as a keyboard to rewrite the information contents of the item (step S75). At this time, if the user can see not only the prepared template but also information items regarding the template such as the document title and the creation date, the user can easily customize the template. FIG. 15 shows an example of displayed information items on the template information displaying part 106.

When the document management system receives the rewriting instruction of the information items, the template information processing part 101 writes the input contents as the updated template information in the template storage area 104 (step S76) and then the template information rewriting process is terminated.

A document management system according to the seventh embodiment of the present invention has a function for customizing a template attached to a document file by a user's manipulation when the document file is registered.

Figure 16:
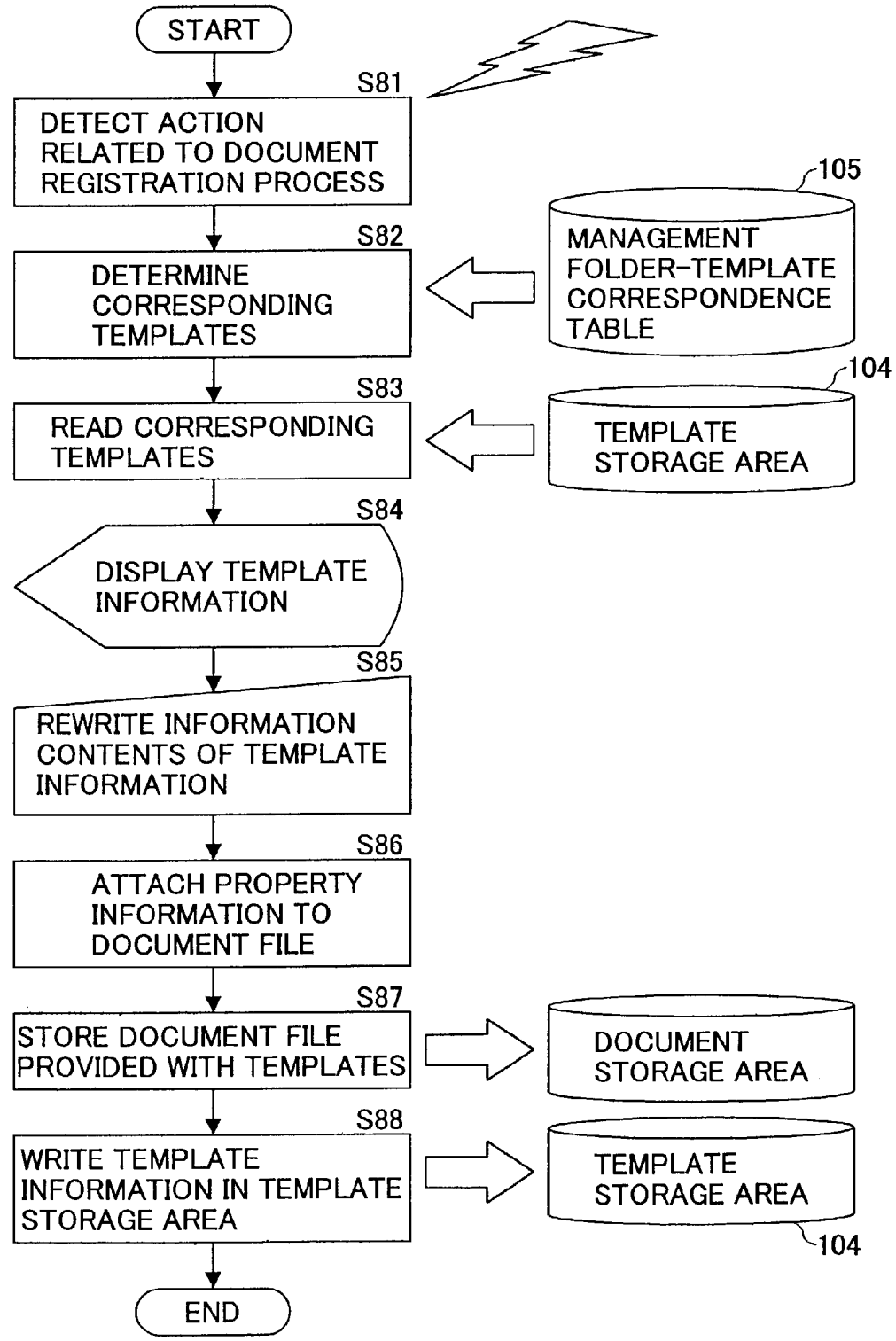
FIG. 16 is a flowchart of a document registration process accompanying a template rewriting process according to a seventh embodiment of the present invention.

FIG. 16 is a flowchart of the document registration process according to the seventh embodiment. In this embodiment, a template of a document file is rewritten by a user's input manipulation through a GUI.

When the document management system receives some actions related to the document registration process such as a document creating operation by the user or a file delivery through e-mail, the control part 102 starts the document registration process according to the seventh (step S81). The control part 102 causes the template information processing part 101 to read templates.

The template information processing part 101 reads template IDs associated with a designated folder where the document file is to be stored with reference to the management folder-template correspondence table 105 and then determines the corresponding templates to be processed (step S82).

Based on the obtained template IDs, the template information processing part 101 reads the corresponding templates with reference to the template information table in the template storage area 104 (step S83).

At this time, in this embodiment, the user can determine whether or not the read templates are appropriate for the registered document file. If the user determines that the templates are not appropriate, the document management system according to the seventh embodiment enables the user to rewrite an information item regarding the templates. In order to implement the above process, the document management system displays the templates on the template information displaying part 106 (step S84).

When such template information is displayed, the user selects an item that the user wants to change among items that the user is allowed to change. The user uses the input part 108 such as a keyboard to rewrite information contents of the item (step S85). At this time, the document management system enables the user to add an information item regarding the template information like the sixth embodiment.

When the document management system receives the rewriting instruction of the information items, the template information rewriting part 110 rewrites the template and then attaches the information contents of the template to the document file (step S86). Then, the document file provided with the rewritten template is stored in the document storage area 103 (step S87).

In addition, when the user instructs the document management system to rewrite the template as mentioned above, the template information processing part 101 writes and stores the rewritten template of the folder in the template storage area 104 (step S88).

After that, the information rewriting process according to the seventh embodiment is terminated.

Here, in order to reflect the rewritten template in the management folder-template correspondence table 105, it is necessary to add the template inheritance process.

In a document management system according to the eighth embodiment of the present invention, when an existing registered folder is copied to another destination folder, the document management system can determine whether or not the destination folder can deal with templates attached to the copied folder. Then, if the destination folder cannot deal with the templates of the copied folder, the document management system automatically terminates the current process. Otherwise, the document management system continues the process. As a result, it is possible to provide a document management system that can realize high flexibility and operability.

Figure 17:
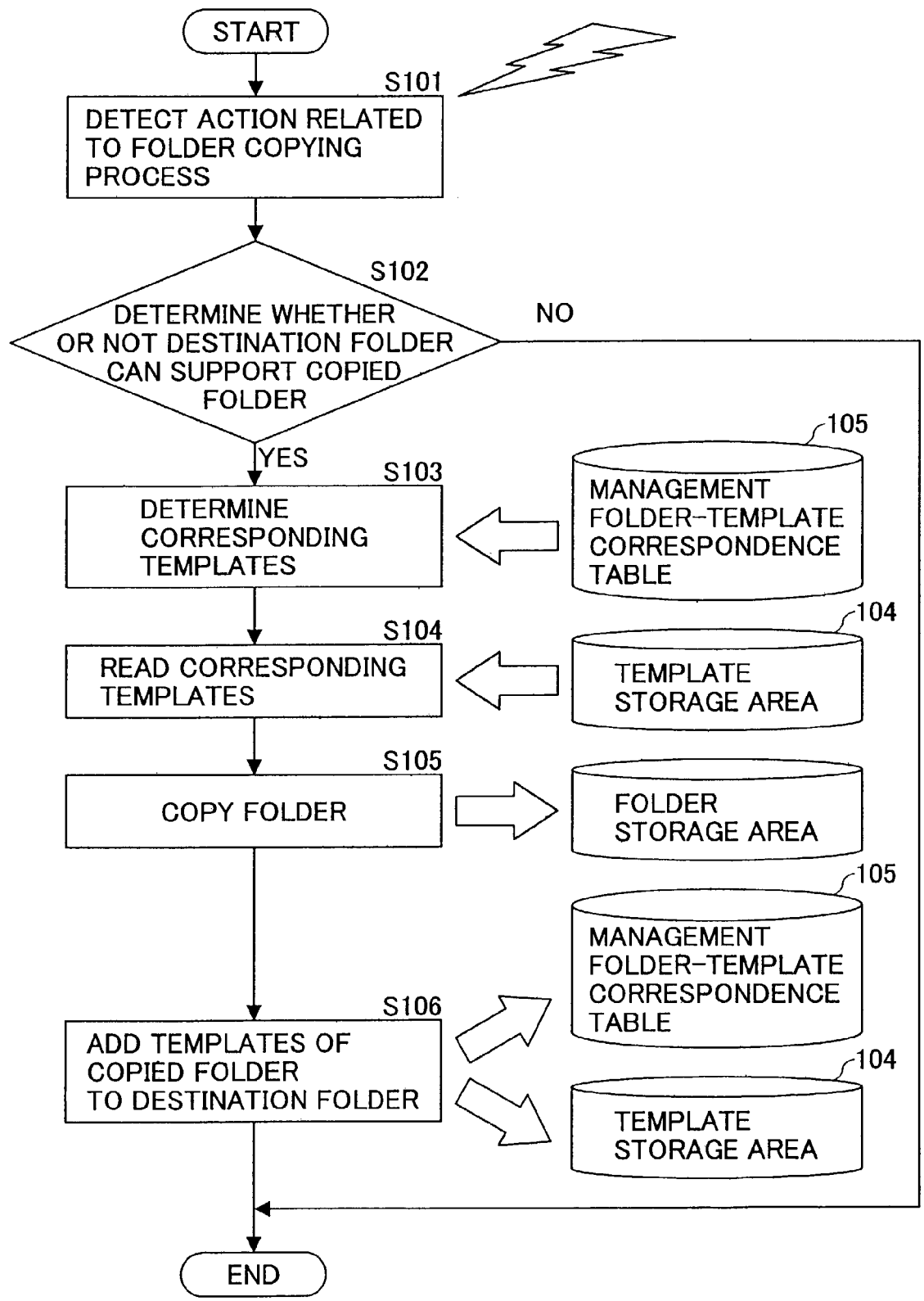
FIG. 17 is a flowchart of a folder copying process according to an eighth embodiment of the present invention.

FIG. 17 is a flowchart of a folder copying process according to the eighth embodiment. The folder function determining part 113 works for the folder copying process. If the copied folder and the destination folder have management folder areas in which the folders are different from each other, the folder function determining part 113 possesses in advance or fetches information indicating whether or not the destination folder has the management folder area where the templates of the copied folder can be dealt with. When the copied folder is registered to the destination folder, the folder function determining part 113 is ready to determine whether or not the destination folder can deal with the templates of the copied folder based on the prepared information.

When the document management system receives an action related to the folder copying process, the control part 102 starts the folder copying process (step S101). The control part 102 uses the folder function determining part 113 to determine whether or not the destination folder has the function capable of dealing with the templates of the copied folder, that is, whether the destination folder can support the templates of the copied folder (step S102).

If the destination folder cannot support the templates of the copied folder, the folder copying process is terminated. Thus, there is no possibility that the copied folder is registered with the destination folder and is erroneously operated therein.

If the destination folder can support the templates of the copied folder, the template information processing part 101 reads template IDs associated with the copied folder with reference to the management folder-template correspondence table 105 and then determines the corresponding templates to be processed (step S103). Based on the obtained template IDs, the template information processing part 101 reads the corresponding templates in the template storage area 104 (step S104).

Then, the template information processing part 101 registers the copied folder and the corresponding templates thereof with the destination folder and stores the copied folder in a folder storage area (step S105). After that, the template information processing part 101 additionally attaches the corresponding templates to the destination folder (step S106) and then the folder copying process is terminated.

In a document management system according to the ninth embodiment of the present invention, when a user instructs the document management system to execute the folder copying process as mentioned in the eighth embodiment, the user can confirm the templates of a copied folder through the template information displaying part 106 and the template information distributing and printing part 107. Based on the output templates, the user determines whether or not the destination folder can deal with the templates of the copied folder. If the destination folder cannot deal with the templates of the copied folder, the document management system terminates the template information output process. The following description provides cases where the templates of the copied folder are output in the three forms: displaying, distributing and printing.

Figure 18:
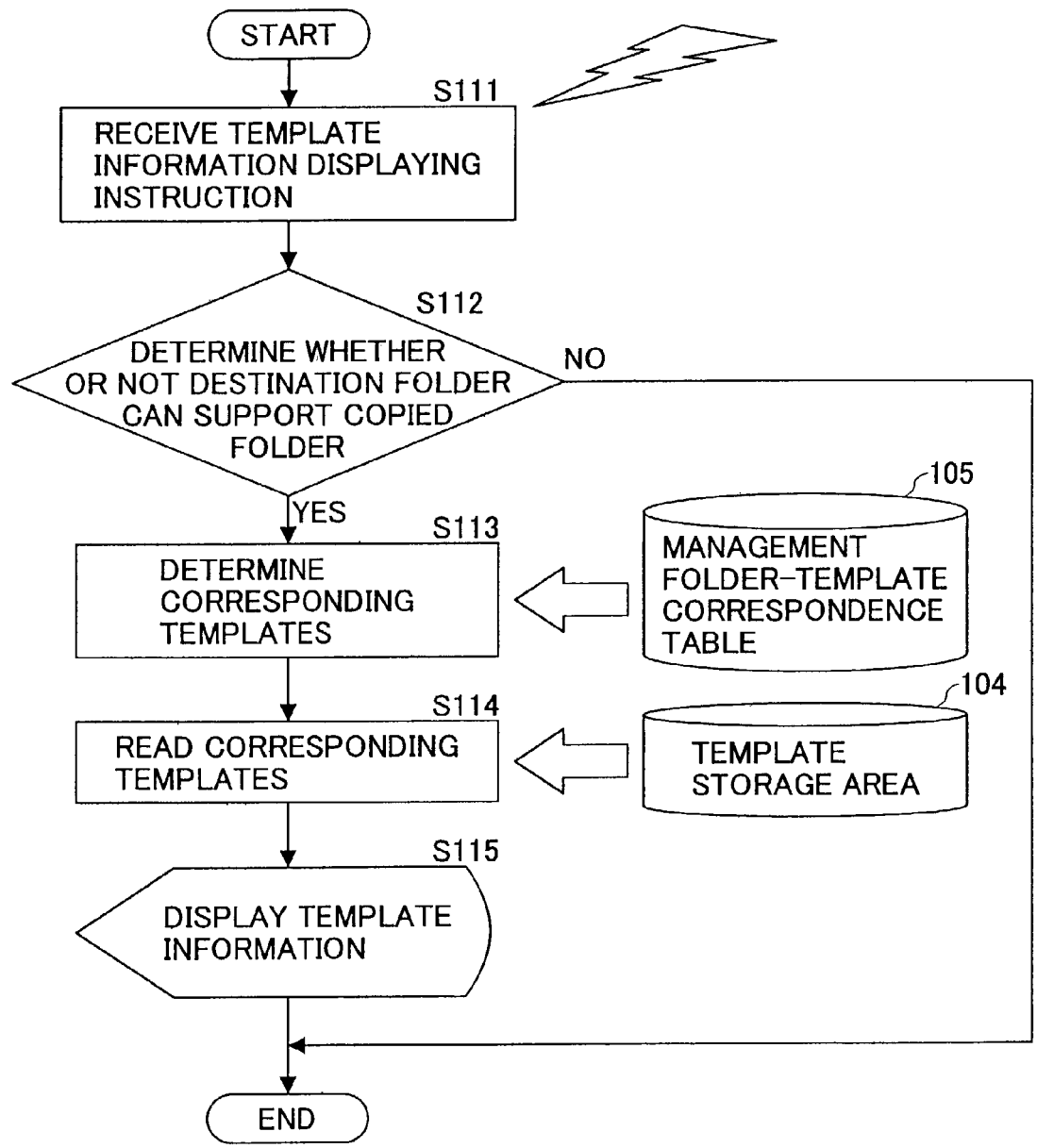
FIG. 18 is a flowchart of a template information displaying process according to a ninth embodiment of the present invention.
Figure 19:
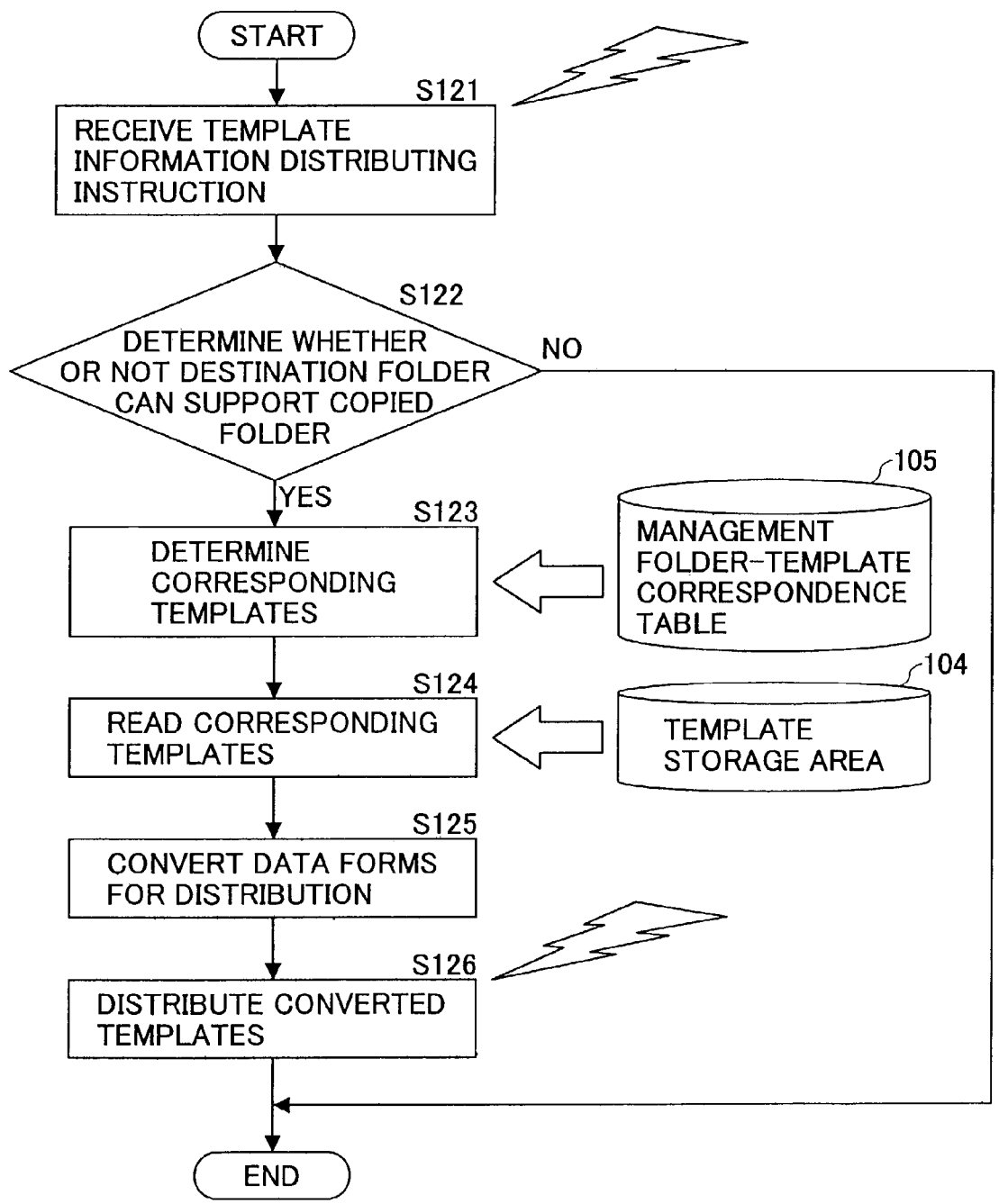
FIG. 19 is a flowchart of a template information distributing process according to the ninth embodiment of the present invention.
Figure 20:
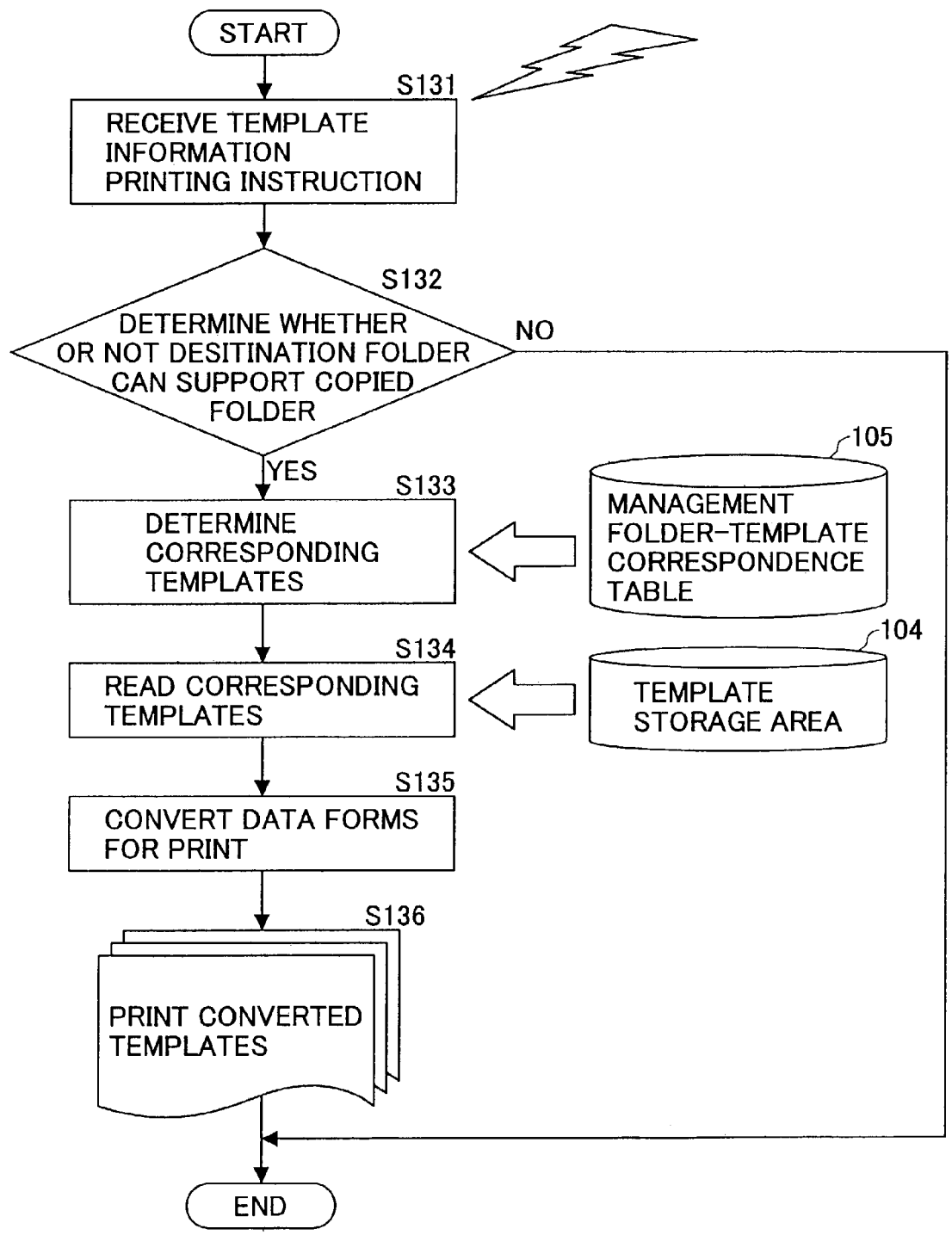
FIG. 20 is a flowchart of a template information printing process according to the ninth embodiment of the present invention.

FIGS. 18 through 20 are flowcharts of the template information output process according to the ninth embodiment. FIG. 18 handles the case where the template is displayed on the template information displaying part 106, and FIG. 19 and FIG. 20 handle the cases where the templates are distributed and the templates are printed through the template information distributing and printing part 107.

Referring to FIG. 18, when a user instructs the document management system to execute the folder copying process and designates a folder to be copied, the document management system receives an action for displaying templates attached to the folder and the control part 102 starts the template information displaying process (step S111).

Then, the folder function determining part 113 determines whether or not the destination folder has the function of dealing with the templates of the copied folder, that is, whether the destination folder can support the templates of the copied folder (step S112).

If the destination folder cannot support the templates of the copied folder, the folder information displaying process is terminated. Thus, it is possible to avoid trouble in advance caused by an erroneous operation of the copied folder.

On the other hand, if the destination folder can support the templates of the copied folder, the templates of the copied folder are displayed on the template information displaying part 106 similarly to the template information displaying process according to the fifth embodiment. Accordingly, a further description thereof is omitted.

Referring to FIG. 19 and FIG. 20, the folder function determining part 113 determines whether or not the destination folder can support the templates of the copied folder (steps S122 and S132), which is similar to step S112 with respect to the template information displaying process. Also, the template information distributing process and the template information printing process according to this embodiment are similar to those according to the fifth embodiment. Thus, a further description thereof is omitted.

In a document management system according to the tenth embodiment of the present invention, when a user attempts to register a document file with a destination folder, the document management system compares a template environment of the document file with folder templates of the destination folder and selectively performs a process that can support the template of the document file. As a result, it is possible to provide a more flexible document management system.

The folder function determining part 113 determines whether or not the document file can be handled in the destination folder. In this embodiment, the folder function determining part 113 makes the determination by checking whether or not the document file contains document information and furthermore whether the folder template can deal with the document file. Also, in order to use the document information of the document file to perform the document registration process according to this embodiment, it is necessary to use the document information reading part 114.

Figure 22:
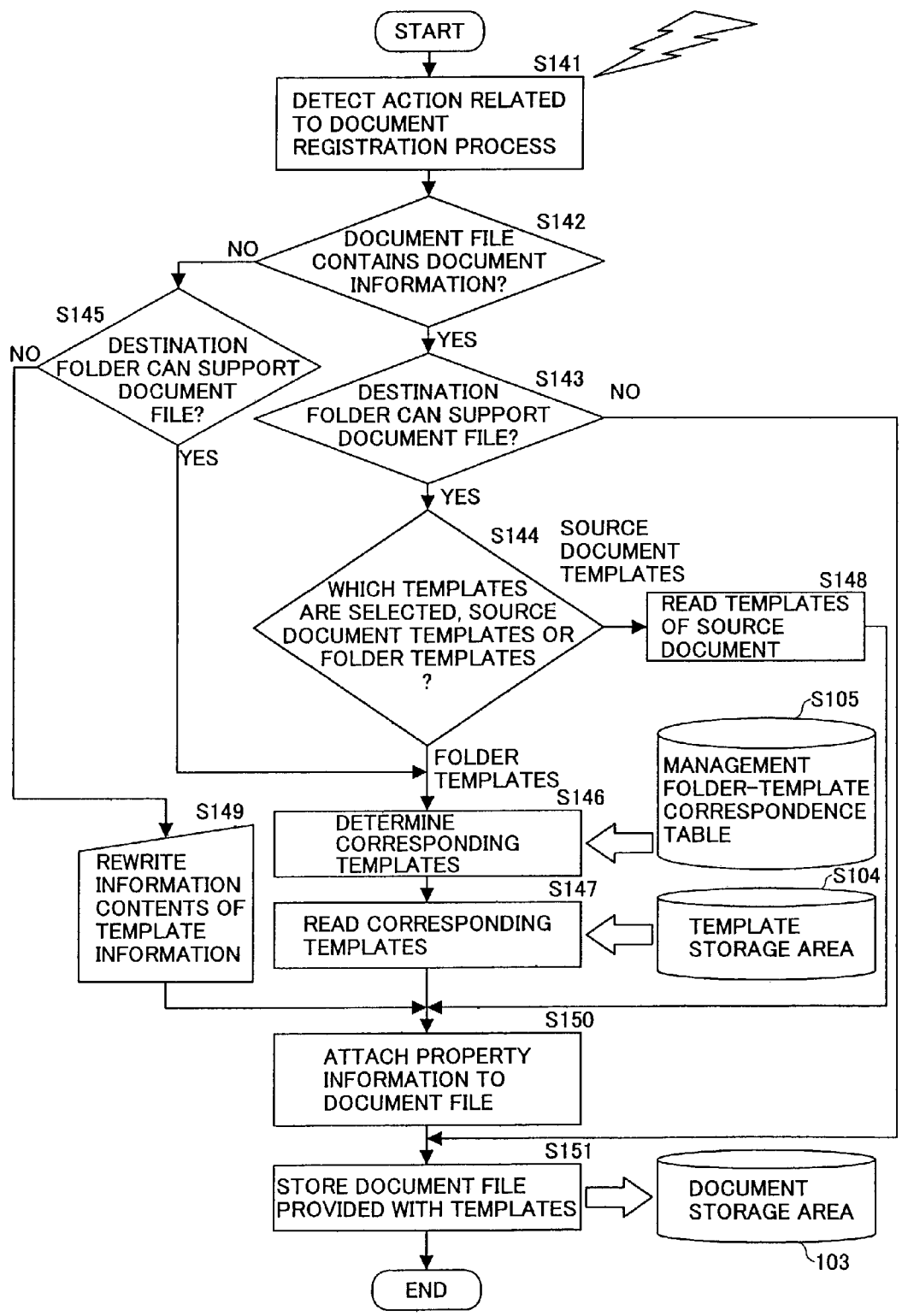
FIG. 22 is a flowchart of a document registration process according to the tenth embodiment.

FIG. 22 is a flowchart of the document registration process according to the tenth embodiment. In this embodiment, when the document management system detects some actions related to the document registration process such as a document creating operation by the user or a file delivery through e-mail, the control part 102 starts the document registration process (step S141). The control part 102 uses the folder function determining part 113 to determine whether or not the document file contains document information (step S142). After the determination, the folder function determining part 113 further determines whether or not the destination folder can support the templates of the document file (steps S143 and S145).

Based on the determination results, the document registration process proceeds to one of the following four categories as shown in FIG. 21.

category 1: the templates of the source document file are inherited.

category 2: the templates of the source document file are inherited or the folder templates are adopted.

category 3: the user newly registers a template of the document file.

category 4: the folder templates are adopted.

Based on the above categories, the document management system proceeds to one of four branches in the flowchart in FIG. 22.

In a case where the document file has the document information and the folder templates do not support the template of the document file (step S143: N), the templates of the source document file are directly inherited, that is, the source document file is stored in the document storage area 103 (step S151) and then the document registration process is terminated.

In a case where the document file has the document information and the folder templates do not support the template of the document file (step S143: Y), the templates of the source document file are directly inherited or the folder templates are adopted. Accordingly, one of these alternatives have to be selected (step S144). If the templates of the source document file are inherited, the document information reading part 114 is used to read the document information (property information) from the source document file (step S148). Then, the property information is attached to the document file to be registered (step S150). The registered document file is stored in the document storage area 103 (step S151) and then the document registration process is terminated. On the other hand, if the folder templates are adopted, the template information processing part 101 reads template IDs associated with the destination folder with reference to the management folder-template correspondence table 105 and determines the corresponding template in the template storage area 104 (step S146). Then, the template information processing part 101 reads the corresponding templates from the template storage area 104 (step S147). After that, the template information processing part 101 attaches the corresponding templates to the newly registered document file (step S150). The template information processing part 101 stores the attached document file in the document storage area 103 (step S151) and then the document registration process is terminated.

In a case where the source document file has no document information and the folder templates do not support the templates of the source document file (step S145: N), since the document management system does not automatically set a template to the document file, the user needs to use the input part 108 to input document information (property information) so that the document file can be supported in the destination folder (step S149). The template information processing part 101 attaches input property information to the document file (step S150). After that, the template information processing part 101 stores the attached document file in the document storage area 103 (step S151) and then the document registration process is terminated.

In a case where the source document has no document information and the folder templates support the templates of the source document file (step S145: Y), since the folder templates are adopted, the template information processing part 101 reads template IDs associated with the source document file with reference to the management folder-template correspondence table 105 and determines the corresponding template (step S146). Then, the template information processing part 101 reads the corresponding templates from the template storage part 104 (step S147). After that, the template information processing part 101 attaches property information to the document file (step S150). The template information processing part 101 stores the attached document file in the document storage area 103 (step S151) and then the document registration process is terminated.

Figure 23:
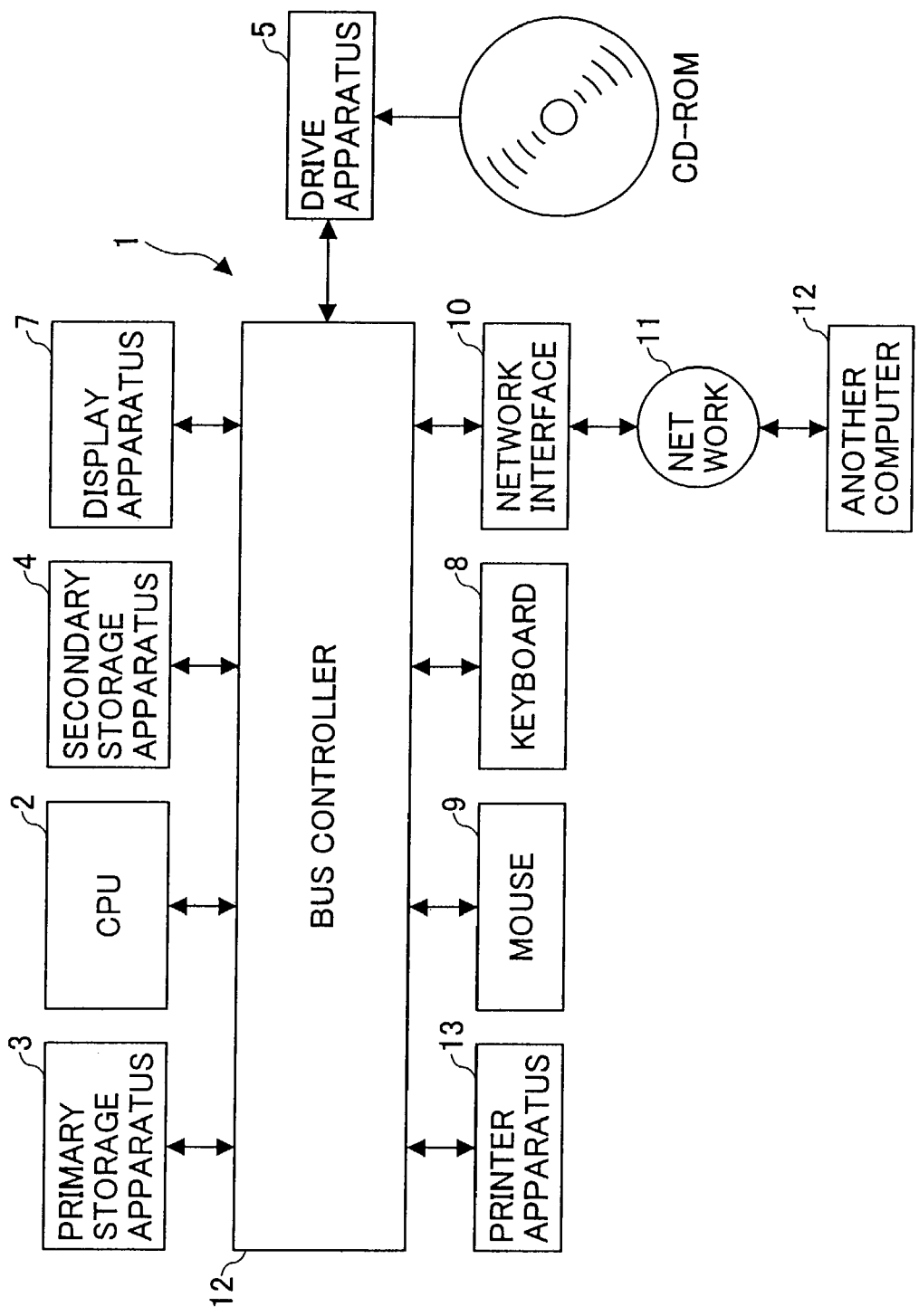
FIG. 23 is a block diagram illustrating a hardware configuration of a computer for performing a document management program according to the present invention.

FIG. 23 is a block diagram illustrating a hardware configuration of a computer 1 for implementing the document management system according to the present invention. As is shown in FIG. 23, the computer 1 comprises a CPU (Central Processing Unit) 2 for processing information, a primary storage apparatus 3 such as a RAM (Random Access Memory) for temporarily storing information during execution by the CPU 2, a secondary storage apparatus 4 such as a HDD (Hard Disk Drive) for storing some data such as a result of the execution, a drive apparatus 5 of a removable recording medium 6 such as a CD-ROM for storing/distributing information in/to an exterior of the computer 1 and obtaining information from an exterior of the computer 1, a display apparatus 7 for displaying a process and a result of the execution to a user, an input apparatus such as a keyboard 8 and a mouse 9 through which the user can input an instruction and information, a network interface 10 for connecting to a network 11 so as to communicate with another computer 12 in the exterior of the computer 1, and a printer apparatus 13 for printing out information in the computer 1. These parts are connected each other via a bus.

The document information system can be implemented with the computer 1 by executing programs that follow the above-mentioned flowcharts according to the embodiments of the present invention. These programs may be stored in the secondary storage apparatus 4 in advance or may be read from a removable recording medium 6 such as a CD-ROM via the drive apparatus 5 into the secondary storage apparatus 4.

Furthermore, the template information displaying part 106 is formed of the display apparatus 7. A user can display information in the document management system on the display apparatus 7. The template information distributing and printing part 107 is formed of the network interface 10 and the printer 13 and the like. A user can distribute information in the document management system to the other computer 12 in the exterior of the computer 1 via the network interface 10 and confirm information in the document management system through a paper-based document printed by the printer 13.

The present invention is not limited to the specifically disclosed embodiments, and variations and modifications may be made without departing from the scope of the present invention.

The present application is based on Japanese priority applications No. 2002-048383 filed Feb. 25, 2002 and No. 2003-027379 filed Feb. 4, 2003, the entire contents of which are hereby incorporated by reference.

What is claimed is:

1. A document management system for managing a document in a folder with which document property information is associated and wherein said folder is in a hierarchical structure, said system comprising:
 a first processing part for associating at least two templates of document property information with a subfolder or a document, wherein the associations are carried out by inheriting the templates of document property information associated with a folder to said subfolder or said document when said subfolder or said document is set in said folder, and for retaining said associations and said templates of document property information therein;
 a second processing part for associating at least two templates of document property information with a folder, wherein the associations are carried out by inheriting the templates of document property information associated with a subfolder or a document to said folder when said subfolder or said document is set in said folder, and for retaining said associations and said templates of document property information therein;
 a third processing part for associating at least two templates of document property information with a subfolder or a document and a folder, wherein the associations are carried out by inheriting the templates of document property information associated with said subfolder or said document and said folder to each other when one of a subfolder and a document is set in said folder, and for retaining said associations and said templates of document property information therein; and
 a fourth processing part for associating all templates of document property information corresponding to a data type of a document with a folder, wherein the associations are carried out by inheriting the templates of document property information associated with said data type to said folder when said document is set in said folder, and for retaining said associations and said all the templates of document property information therein,
 wherein said first processing part, said second processing part, said third processing part and said fourth processing part are selectively performed in accordance with an instruction of a user.

2. The document management system as claimed in claim 1, wherein the templates of document property information associated with said folder is copied to a subfolder of said folder.

3. The document management system as claimed in claim 2, wherein the templates of document property information associated with said folder, the templates of document property information associated with said subfolder and the templates of document property information associated with said document are rewritten.

4. The document management system as claimed in claim 3, wherein the templates of document property information associated with said folder, the templates of document property information associated with said subfolder and the templates of document property information associated with said document are output for confirmation by the user.

5. A document management program for causing a computer to manage a document in a folder with which document property information is associated and wherein said folder is in a hierarchical structure, comprising:
 a first processing step of associating at least two templates of document property information with a subfolder or a document, wherein the associations are carried out by inheriting the templates of document property information associated with a folder to said subfolder or said document when said subfolder or said document is set in said folder, and retaining said associations and said templates of document property information therein;
 a second processing step of associating at least two templates of document property information with a folder, wherein the associations are carried out by inheriting the templates of document property information associated with a subfolder or a document to said folder when said subfolder or said document is set in said folder, and retaining said associations and said templates of document property information therein;
 a third processing step of associating at least two templates of document property information with a subfolder or a document and a folder, wherein the associations are carried out by inheriting the templates of document property information associated with said subfolder or said document and said folder to each other when said subfolder or said document is set in said folder, and retaining said associations and said templates of document property information therein; and
 a fourth processing step of associating all templates of document property information corresponding to a data type of a document with a folder, wherein the associations are carried out by inheriting the templates of document property information associated with said data type to said folder, and retaining said associations said all the templates of document property information therein,
 wherein said first processing step, said second processing step, said third processing step and said fourth processing step are selectively performed in accordance with an instruction of a user.

6. The document management program as claimed in claim 5, wherein the templates of document property information associated with said folder is copied to a subfolder of said folder.

7. The document management program as claimed in claim 6, wherein the templates of document property information associated with said folder, the templates of document property information associated with said subfolder and the templates of document property information associated with said document are rewritten.

8. The document management program as claimed in claim 7, wherein the templates of document property information associated with said folder, the templates of document property information associated with said subfolder and the templates of document property information associated with said document are output for confirmation by the user.

9. A recording medium for recording a document management program for causing a computer to manage a document in a folder with which document property information is associated and wherein said folder is in a hierarchical structure, comprising:

a first processing step of associating at least two templates of document property information with a subfolder or a document, wherein the associations are carried out by inheriting the templates of document property information associated with a folder to said subfolder or said document when said subfolder or said document is set in said folder, and retaining said associations and said templates of document property information therein;

a second processing step of associating at least two templates of document property information with a folder, wherein the associations are carried out by inheriting the templates of document property information associated with a subfolder or a document to said folder when said subfolder or said document is set in said folder and retaining said associations and templates of said document property information therein;

a third processing step of associating at least two templates of document property information with a subfolder or a document and a folder, wherein the associations are carried out by inheriting the templates of document property information associated with said subfolder or said document and said folder to each other when said subfolder or said document is set in said folder and retaining said associations and said templates of document property information therein; and a fourth processing step of associating all templates of document property information corresponding to a data type of a document with a folder, wherein the associations are carried out by inheriting the templates of document property information associated with said data type to said folder and retaining said associations and said all the templates of document property information therein, wherein said first processing step, said second processing step, said third processing step and said fourth processing step are selectively performed in accordance with an instruction of a user.

10. The recording medium as claimed in claim 9, wherein the templates of document property information associated with said folder is copied to a subfolder of said folder.

11. The recording medium as claimed in claim 10, wherein the templates of document property information associated with said folder, the templates of document property information associated with said subfolder and the templates of document property information associated with said document are rewritten.

12. The recording program as claimed in claim 11, wherein the templates of document property information associated with said folder, the templates of document property information associated with said subfolder and the templates of document property information associated with said document are output for confirmation by the user.

* * * * *

UNITED STATES PATENT AND TRADEMARK OFFICE
CERTIFICATE OF CORRECTION

PATENT NO.       : 7,650,363 B2                          Page 1 of 1
APPLICATION NO. : 10/369622
DATED            : January 19, 2010
INVENTOR(S)      : Yuki Kitamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Twenty-eighth Day of December, 2010

David J. Kappos
*Director of the United States Patent and Trademark Office*